(12) United States Patent
Hsu et al.

(10) Patent No.: US 8,503,112 B2
(45) Date of Patent: Aug. 6, 2013

(54) IMAGE CAPTURING LENS ASSEMBLY

(75) Inventors: Po-Lun Hsu, Taichung (TW);
Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 190 days.

(21) Appl. No.: 13/225,491

(22) Filed: Sep. 5, 2011

(65) Prior Publication Data

US 2012/0281299 A1 Nov. 8, 2012

(30) Foreign Application Priority Data

May 3, 2011 (TW) .............................. 100115498 A

(51) Int. Cl.
*G02B 9/34* (2006.01)
*G02B 3/02* (2006.01)

(52) U.S. Cl.
USPC ............................ 359/773; 359/715; 359/772

(58) Field of Classification Search
USPC ........................................ 359/715, 772, 773
See application file for complete search history.

(56) References Cited

U.S. PATENT DOCUMENTS

| 7,145,736 | B2 | 12/2006 | Noda |
| 7,365,920 | B2 | 4/2008 | Noda |
| 7,548,384 | B1 * | 6/2009 | Liang et al. ................... 359/773 |

* cited by examiner

*Primary Examiner* — William Choi
(74) *Attorney, Agent, or Firm* — CKC & Partners Co., Ltd.

(57) ABSTRACT

An image capturing lens assembly comprises, in order from an object side to an image side, a first lens element with positive refractive power having a convex object-side surface, a second lens element with refractive power, a third lens element with positive refractive power having a convex image-side surface, and a fourth lens element with refractive power having a convex object-side surface and a concave image-side surface. The object-side surface and the image-side surface of the fourth lens element are aspheric and have at least one inflection point.

20 Claims, 16 Drawing Sheets

IMAGE CAPTURING LENS ASSEMBLY

RELATED APPLICATIONS

The application claims priority to Taiwan Application Serial Number 100115498, filed May 3, 2011, which is herein incorporated by reference.

BACKGROUND

1. Technical Field

The present invention relates to an image capturing lens assembly. More particularly, the present invention relates to a compact image capturing lens assembly applicable to electronic products.

2. Description of Related Art

In recent years, with the popularity of mobile products with camera functionalities, the demand for compact image capturing lens assembly is increasing. The sensor of a conventional photographing camera is typically a CCD (Charge-Coupled Device) image sensor or a CMOS (Complementary Metal-Oxide-Semiconductor) sensor. As advanced semiconductor manufacturing technologies have allowed the pixel size of sensors to be reduced and compact image capturing lens assemblies have gradually evolved toward higher megapixels, there is an increasing demand for compact image capturing lens assemblies featuring better image quality.

A conventional compact image capturing lens assembly in a portable electronic product typically utilizes a three-element lens structure. Such a conventional image capturing lens assembly has a first lens element with positive refractive power, a second lens element with negative refractive power and a third lens element with positive refractive power. The first, second and third lens elements are arranged in this order from an object-side to an image-side. While the three-element lens structure is compact, it is not able to produce high quality images.

Another conventional compact image capturing lens assembly provides a four-element lens structure. The first lens element and the second lens element of the four-element lens structure are two glass spherical lens elements which are attached to each other to form a doublet lens for eliminating chromatic aberration. However, this lens structure requires a longer total optical track length caused by insufficient degrees of freedom in setting system parameters due to too many spherical lenses allocated. Moreover, it is not easy to attach the glass lenses, and thus the manufacturing process for forming the glass doublet lenses is difficult.

SUMMARY

According to one aspect of the present disclosure, an image capturing lens assembly includes, in order from an object side to an image side, a first lens element, a second lens element, a third lens element and a fourth lens element. The first lens element with positive refractive power has a convex object-side surface. The second lens element has refractive power. The third lens element with positive refractive power has a convex image-side surface. The fourth lens element with refractive power has a convex object-side surface and a concave image-side surface. The object-side surface and the image-side surface of the fourth lens element are aspheric, and the fourth lens element has at least one inflection point formed on at least one of the object-side surface and the image-side surface thereof. When a central thickness of the first lens element is CT1, a central thickness of the second lens element is CT2, a central thickness of the third lens element is CT3, a central thickness of the fourth lens element is CT4, an axial distance between the first lens element and the second lens element is T12, an axial distance between the second lens element and the third lens element is T23, an axial distance between the third lens element and the fourth lens element is T34, a curvature radius of the object-side surface of the second lens element is R3, and a curvature radius of the image-side surface of the second lens element is R4, the following relationships are satisfied:

$$0.2 < (CT1+CT2+CT4)/CT3 < 0.93;$$

$$0 < (T23+T34)/T12 < 1; \text{ and}$$

$$0 < (R3+R4)/(R3-R4) < 5.$$

According to another aspect of the present disclosure, an image capturing lens assembly includes, in order from an object side to an image side, a first lens element, a second lens element, a third lens element and a fourth lens element. The first lens element with positive refractive power has a convex object-side surface. The second lens element has refractive power. The third lens element with positive refractive power has a convex image-side surface. The fourth lens element with refractive power has a convex object-side surface and a concave image-side surface. The object-side surface and the image-side surface of the fourth lens element are aspheric, and the fourth lens element has at least one inflection point formed on at least one of the object-side surface and the image-side surface thereof. When a central thickness of the first lens element is CT1, a central thickness of the second lens element is CT2, a central thickness of the third lens element is CT3, a central thickness of the fourth lens element is CT4, an axial distance between the first lens element and the second lens element is T12, an axial distance between the second lens element and the third lens element is T23, an axial distance between the third lens element and the fourth lens element is T34, a curvature radius of the object-side surface of the fourth lens element is R7, and a focal length of the image capturing lens assembly is f, the following relationships are satisfied:

$$0.2 < (CT1+CT2+CT4)/CT3 < 0.93;$$

$$0 < (T23+T34)/T12 < 1; \text{ and}$$

$$0 < R7/f < 0.80.$$

DETAILED DESCRIPTION

Figure 1:
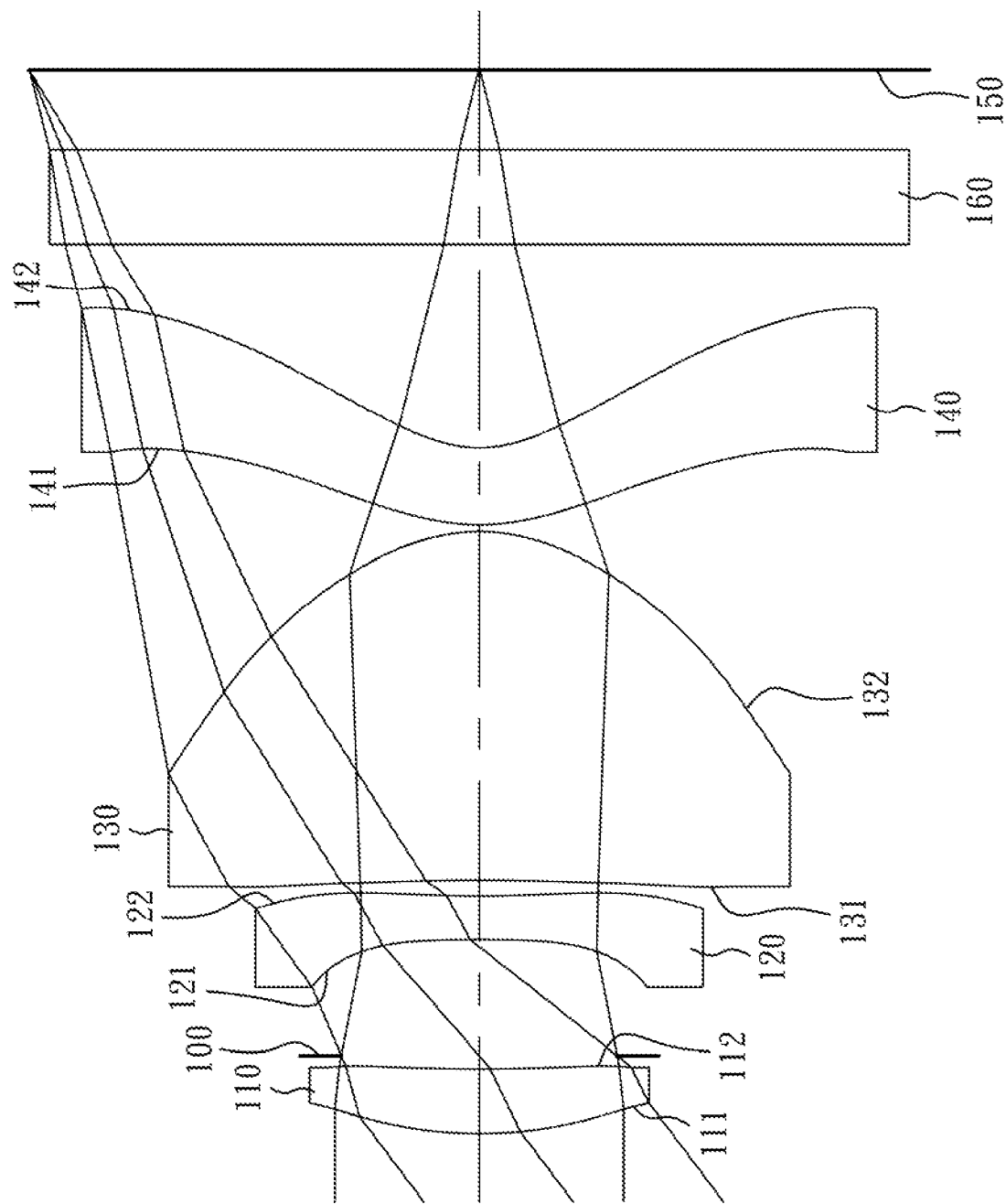
FIG. 1 is a schematic view of an image capturing lens assembly according to the first embodiment of the present disclosure.

An image capturing lens assembly includes, in order from an object side to an image side, a first lens element, a second lens element, a third lens element and a fourth lens element. The image capturing lens assembly further includes an image sensor located on an image plane.

The first lens element with positive refractive power can reduce the photosensitivity of the image capturing lens assembly by providing a partial distribution of the refractive power of the third lens element. The first lens element can have a convex object-side surface and a convex image-side surface or a convex object-side surface and a concave image-side surface such as a meniscus. When the first lens element has a convex object-side surface and a convex image-side surface, the refractive power thereof can be effectively enhanced, thus reducing the total track length of the image capturing lens assembly. When the first lens element has a convex object-side surface and a concave image-side surface, the spherical aberration of the image capturing lens assembly can be corrected.

The second lens element with negative refractive power can correct the aberration generated from the first lens element, and can also correct the chromatic aberration within the image capturing lens assembly. The second lens element has a concave image-side surface which can further correct the aberration of the image capturing lens assembly.

The third lens element with positive refractive power provides main refractive power for reducing the total track length of the image capturing lens assembly. The third lens element can have a concave object-side surface and a convex image-side surface, so that the astigmatism of the image capturing lens assembly can be corrected.

The fourth lens element can have negative refractive power, so that the principal point of the image capturing lens assembly can be positioned away from the image plane, and the total track length of the image capturing lens assembly can be reduced so as to maintain the compact size of the image capturing lens assembly. The fourth lens element has a convex object-side surface and a concave image-side surface which can correct the astigmatism and the high order aberration of the image capturing lens assembly.

Moreover, both the second lens element and the fourth lens element have at least one inflection point formed on at least one of the object-side surface and the image-side surface thereof. Therefore, the incident angle of the off-axis field of light on the image sensor can be efficiently restrained and the aberration of the off-axis field can be corrected.

When a central thickness of the first lens element is CT1, a central thickness of the second lens element is CT2, a central thickness of the third lens element is CT3, and a central thickness of the fourth lens element is CT4, the following relationship is satisfied:

$$0.2<(CT1+CT2+CT4)/CT3<0.93.$$

Therefore, the central thickness of the third lens element can reduce the total track length of the image capturing lens assembly.

CT1, CT2, CT3 and CT4 can further satisfy the following relationship:

$$0.3<(CT1+CT2+CT4)/CT3<0.7.$$

When an axial distance between the first lens element and the second lens element is T12, an axial distance between the second lens element and the third lens element is T23, and an axial distance between the third lens element and the fourth lens element is T34, the following relationship is satisfied:

$$0<(T23+T34)/T12<1.$$

Therefore, the fabrication of the image capturing lens assembly can be easier due to the desirable axial distance in the present disclosure between the lens elements, and the total track length of the image capturing lens assembly can be further reduced.

T12, T23 and T34 can further satisfy the following relationship:

$$(T23+T34)/T12<0.32.$$

When a curvature radius of the object-side surface of the second lens element is R3, and a curvature radius of the image-side surface of the second lens element is R4, the following relationship is satisfied:

$$0<(R3+R4)/(R3-R4)<5.$$

Therefore, the aberration of the first lens element can be corrected, and the refractive power of the second lens element will not be too large, such that the production of excessive high order aberrations can be prevented.

When a curvature radius of the object-side surface of the fourth lens element is R7, and a focal length of the image capturing lens assembly is f, the following relationship is satisfied:

$$0<R7/f<0.80.$$

Therefore, the manufacture and fabrication of the fourth lens element can be easier due to the desirable curvature radius thereof, and the curvature radius of the fourth lens element can further correct the high order aberration of the image capturing lens assembly.

R7 and f can further satisfy the following relationship:

$$0<R7/f<0.65.$$

When the focal length of the image capturing lens assembly is f, and a focal length of the third lens element is f3, the following relationship is satisfied:

$$1.2 < f/f3 < 2.8.$$

Therefore, the third lens element with positive refractive power can provide main refractive power for reducing the total track length of the image capturing lens assembly.

f and f3 can further satisfy the following relationship:

$$1.6 < f/f3 < 2.0.$$

When the focal length of the image capturing lens assembly is f, and a focal length of the first lens element is f1, the following relationship is satisfied:

$$0 < f/f1 < 0.85.$$

Therefore, the refractive power of the first lens element is at a proper level, so that the total track length of the image capturing lens assembly can be controlled and the spherical aberration can be reduced.

When a curvature radius of the object-side surface of the third lens element is R5, and a curvature radius of the image-side surface of the third lens element is R6, the following relationship is satisfied:

$$0.8 < (R5+R6)/(R5-R6) < 1.5.$$

Therefore, the curvature radius of the third lens element can further correct the astigmatism of the image capturing lens assembly.

The image capturing lens assembly can further include a stop, which can be an aperture stop. When an axial distance between the stop and the image-side surface of the fourth lens element is SD, and an axial distance between the object-side surface of the first lens element and the image-side surface of the fourth lens element is TD, the following relationship is satisfied:

$$0.75 < SD/TD < 0.93.$$

If SD/TD<0.75, this would result in the angle of incidence on the image sensor being too large, which would cause poor photographic performance of the image sensor as well as too much chromatic aberration within the image capturing lens assembly. If SD/TD>0.93, this would result in the total track length of the image capturing lens assembly being too long. Therefore, when SD/TD satisfies the above relationship, the image capturing lens assembly has a good balance between the telecentric and wide-angle characteristics, and a desirable total track length of the optical image system can be maintained.

When the Abbe number of the first lens element is V1, and the Abbe number of the second lens element is V2, the following relationship is satisfied:

$$30.5 < V1-V2 < 45.$$

Therefore, the chromatic aberration of the image capturing lens assembly can be corrected.

When a curvature radius of the object-side surface of the first lens element is R1, and a curvature radius of the image-side surface of the first lens element is R2, the following relationship is satisfied:

$$-3.0 < (R1+R2)/(R1-R2) < -0.7.$$

Therefore, the spherical aberration of the image capturing lens assembly can be corrected.

When the focal length of the first lens element is f1, a focal length of the second lens element is f2, the focal length of the third lens element is f3, and a focal length of the fourth lens element is f4, the following relationship is satisfied:

$$0.3 < (|f3|+|f4|)/(|f1|+|f2|) < 0.5.$$

Therefore, the composition of the first lens element and the second lens element can correct the aberration of the image capturing lens assembly effectively, and the composition of the third lens element and the fourth lens element respectively can reduce the back focal length of the image capturing lens assembly so that the total track length of the image capturing lens assembly can be reduced.

When the Abbe number of the first lens element is V1, the Abbe number of the second lens element is V2, and the Abbe number of the fourth lens element is V4, the following relationship is satisfied:

$$-10 < V1-V2-V4 < 25.$$

Therefore, the ability to correct the chromatic aberration of the optical image system can be enhanced.

According to the image capturing lens assembly of the present disclosure, the lens element can be made of glass material or plastic material. When the lens element is made of glass material, the range over which the refractive power of the image capturing lens assembly can be set may be increased. When the lens element is made of plastic material, the cost of manufacture can be effectively reduced. Moreover, the surface of the lens element can be aspheric, so that it is easier to make the surface into other non-spherical shapes. As a result, more controllable variables are obtained, the aberration is reduced and the number of required lens elements is reduced. Therefore, the total track length of the image capturing lens assembly can be reduced.

According to the image capturing lens assembly of the present disclosure, when the lens element has a convex surface, this indicates that the paraxial region of the surface is convex, and when the lens element has a concave surface, this indicates that the paraxial region of the surface is concave.

According to the image capturing lens assembly of the present disclosure, the image capturing lens assembly can include at least one stop for reducing stray light while retaining high image quality. Furthermore, when the stop is an aperture stop, the position of the aperture stop within an optical system can be arbitrarily placed in front of the entire optical system or within the optical system depending on the preference of the designer of the optical system, in order to achieve the desirable optical features or higher image quality produced from the optical system.

According to the above description of the present disclosure, the following 1st-8th specific embodiments are provided for further explanation.

Figure 2:
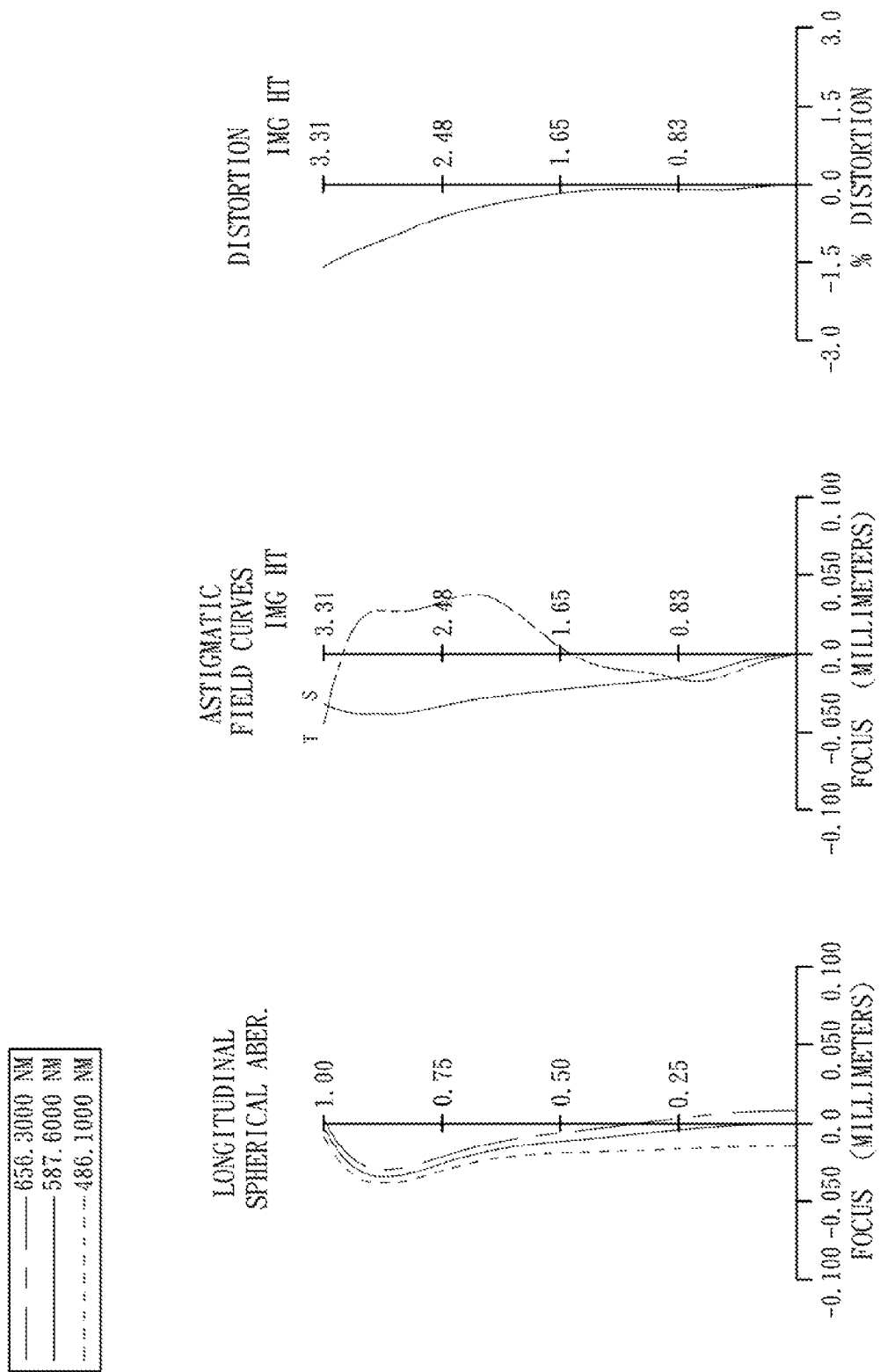
FIG. 2 shows spherical aberration curves, astigmatic field curves and a distortion curve of the image capturing lens assembly according to the first embodiment.

FIG. 1 is a schematic view of an image capturing lens assembly according to the first embodiment of the present disclosure. FIG. 2 shows spherical aberration curves, astigmatic field curves and a distortion curve of the image capturing lens assembly according to the first embodiment. In FIG. 1, the image capturing lens assembly includes, in order from an object side to an image side, the first lens element 110, an aperture stop 100, the second lens element 120, the third lens element 130, the fourth lens element 140, an IR (infrared) cut filter 160 and an image plane 150.

The first lens element 110 is made of plastic material. The first lens element 110 with positive refractive power has a convex object-side surface 111 and a concave image-side surface 112. The object-side surface 111 and the image-side surface 112 of the first lens element 110 are aspheric.

The second lens element 120 is made of plastic material. The second lens element 120 with negative refractive power has a concave object-side surface 121 and a concave image-side surface 122. The object-side surface 121 and the image-side surface 122 of the second lens element 120 are aspheric. Furthermore, the second lens element 120 has inflection points formed on the image-side surface 122 thereof.

The third lens element 130 is made of plastic material. The third lens element 130 with positive refractive power has a concave object-side surface 131 and a convex image-side surface 132. The object-side surface 131 and the image-side surface 132 of the third lens element 130 are aspheric.

The fourth lens element 140 is made of plastic material. The fourth lens element 140 with negative refractive power has a convex object-side surface 141 and a concave image-side surface 142. The object-side surface 141 and the image-side surface 142 of the fourth lens element 140 are aspheric. Furthermore, the fourth lens element 140 has inflection points formed on the object-side surface 141 and the image-side surface 142 thereof.

The IR cut filter 160 is made of glass and located between the fourth lens element 140 and the image plane 150, and will not affect the focal length of the image capturing lens assembly.

The equation of the aspheric surface profiles of the aforementioned lens elements of the first embodiment is expressed as follows:

$$X(Y) = (Y^2/R)/(1 + sqrt(1 - (1+k) \times (Y/R)^2)) + \sum_i (Ai) \times (Y^i)$$

where:

X is the height of a point on the aspheric surface spaced at a distance Y to from the optical axis relative to the tangential plane at the aspheric surface vertex;

Y is the distance from the point on the curve of the aspheric surface to the optical axis;

k is the conic coefficient; and

Ai is the i-th aspheric coefficient.

In the image capturing lens assembly according to the first embodiment, when f is a focal length of the image capturing lens assembly, Fno is an f-number of the image capturing lens assembly, and HFOV is half of the maximal field of view, these parameters have the following values:

f=4.47 mm;
Fno=2.10; and
HFOV=37.1 degrees.

In the image capturing lens assembly according to the first embodiment, when the Abbe number of the first lens element 110 is V1, the Abbe number of the second lens element 120 is V2, and the Abbe number of the fourth lens element 140 is V4, the following relationships are satisfied:

$V1-V2=32.1$; and $V1-V2-V4=8.3$.

In the image capturing lens assembly according to the first embodiment, when an axial distance between the first lens element 110 and the second lens element 120 is T12, an axial distance between the second lens element 120 and the third lens element 130 is T23, and an axial distance between the third lens element 130 and the fourth lens element 140 is T34, the following relationship is satisfied:

$(T23+T34)/T12=0.17$.

In the image capturing lens assembly according to the first embodiment, when a central thickness of the first lens element 110 is CT1, a central thickness of the second lens element 120 is CT2, a central thickness of the third lens element 130 is CT3, and a central thickness of the fourth lens element 140 is CT4, the following relationship is satisfied:

$(CT1+CT2+CT4)/CT3=0.53$.

the image capturing lens assembly according to the first embodiment, when a curvature radius of the object-side surface 111 of the first lens element 110 is R1, a curvature radius of the image-side surface 112 of the first lens element 110 is R2, a curvature radius of the object-side surface 121 of the second lens element 120 is R3, a curvature radius of the image-side surface 122 of the second lens element 120 is R4, a curvature radius of the object-side surface 131 of the third lens element 130 is R5, and a curvature radius of the image-side surface 132 of the third lens element 130 is R6, the following relationships are satisfied:

$(R1+R2)/(R1-R2)=-1.65$;

$(R3+R4)/(R3-R4)=0.21$; and $(R5+R6)/(R5-R6)=1.24$.

In the image capturing lens assembly according to the first embodiment, when a curvature radius of the object-side surface 141 of the fourth lens element 140 is R7, the focal length of the image capturing lens assembly is f, a focal length of the first lens element 110 is f1, a focal length of the second lens element 120 is f2, the focal length of the third lens element 130 is f3, and a focal length of the fourth lens element 140 is f4, the following relationships are satisfied:

$R7/f=0.36$;

$f/f1=0.59$;

$f/f3=1.76$; and $(|f3|+|f4|)/(|f1|+|f2|)=0.46$.

In the image capturing lens assembly according to the first embodiment, when an axial distance between the stop 100 and the image-side surface 142 of the fourth lens element 140 is SD, and an axial distance between the object-side surface 111 of the first lens element 110 and the image-side surface 142 of the fourth lens element 140 is TD, the following relationship is satisfied:

$SD/TD=0.89$.

The detailed optical data of the first embodiment are shown in Table 1 and the aspheric surface data are shown in Table 2 below.

TABLE 1

1st Embodiment
f = 4.47 mm, Fno = 2.10, HFOV = 37.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 3.140000 (ASP) | 0.480 | Plastic | 1.544 | 55.9 | 7.53 |
| 2 | | 12.731500 (ASP) | 0.094 | | | | |
| 3 | Ape. Stop | Plano | 0.861 | | | | |
| 4 | Lens 2 | −12.315900 (ASP) | 0.316 | Plastic | 1.634 | 23.8 | −7.66 |
| 5 | | 8.101400 (ASP) | 0.116 | | | | |
| 6 | Lens 3 | −12.263300 (ASP) | 2.569 | Plastic | 1.544 | 55.9 | 2.54 |
| 7 | | −1.335050 (ASP) | 0.050 | | | | |
| 8 | Lens 4 | 1.622570 (ASP) | 0.567 | Plastic | 1.634 | 23.8 | −4.44 |
| 9 | | 0.889700 (ASP) | 1.500 | | | | |
| 10 | IR-filter | Plano | 0.700 | Glass | 1.517 | 64.2 | — |
| 11 | | Plano | 0.581 | | | | |
| 12 | Image | Plano | — | | | | |

Note:
Reference wavelength (d-line) is 587.6 nm.

TABLE 2

Aspheric Coefficients

| | Surface # | | | |
|---|---|---|---|---|
| | 1 | 2 | 4 | 5 |
| k = | 0.00000E+00 | −1.00000E+00 | 6.71951E+01 | −1.00000E+00 |
| A4 = | 4.48710E−03 | −9.98324E−03 | −1.05208E−01 | −4.74927E−02 |
| A6 = | −9.80627E−03 | 4.27351E−05 | 3.36187E−02 | 9.53190E−03 |
| A8 = | 9.31180E−03 | −7.09857E−03 | −3.52031E−02 | −4.08372E−03 |
| A10 = | −5.89893E−03 | −2.07850E−03 | 9.64841E−03 | 7.07567E−04 |
| A12 = | −5.43886E−04 | 3.67027E−04 | −3.55448E−03 | 4.24536E−05 |

| | Surface # | | | |
|---|---|---|---|---|
| | 6 | 7 | 8 | 9 |
| k = | −2.79660E+01 | −2.70892E+00 | −4.12036E+00 | −2.78753E+00 |
| A4 = | 4.16296E−02 | −2.91444E−02 | −1.63869E−02 | −2.23027E−02 |
| A6 = | −4.74606E−02 | 1.09821E−03 | 1.69468E−05 | 2.59541E−03 |
| A8 = | 3.32569E−02 | 1.57329E−04 | 3.46749E−04 | 8.17635E−05 |
| A10 = | −1.51015E−02 | −1.03848E−04 | −1.47312E−05 | −8.82992E−05 |
| A12 = | 4.23363E−03 | 8.22774E−06 | −9.78471E−06 | 1.38170E−05 |
| A14 = | −6.44910E−04 | 1.06707E−06 | 1.53664E−06 | −9.84428E−07 |
| A16 = | 4.05683E−05 | | −7.28658E−08 | 2.71978E−08 |

In Table 1, the curvature radius, the thickness and the focal length are shown in millimeters (mm). Surface numbers 0-12 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

Figure 3:
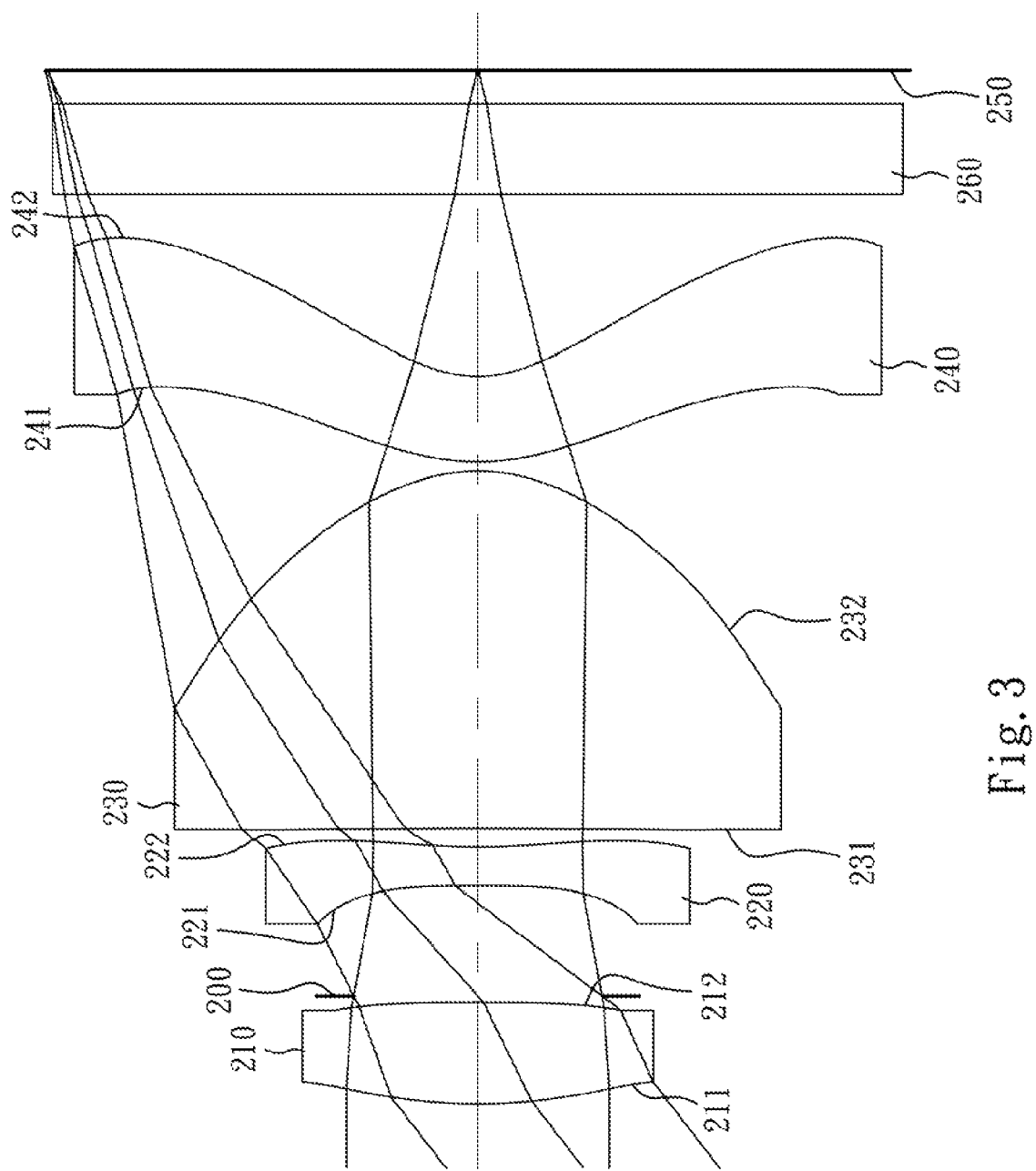
FIG. 3 is a schematic view of an image capturing lens assembly according to the second embodiment of the present disclosure.
Figure 4:
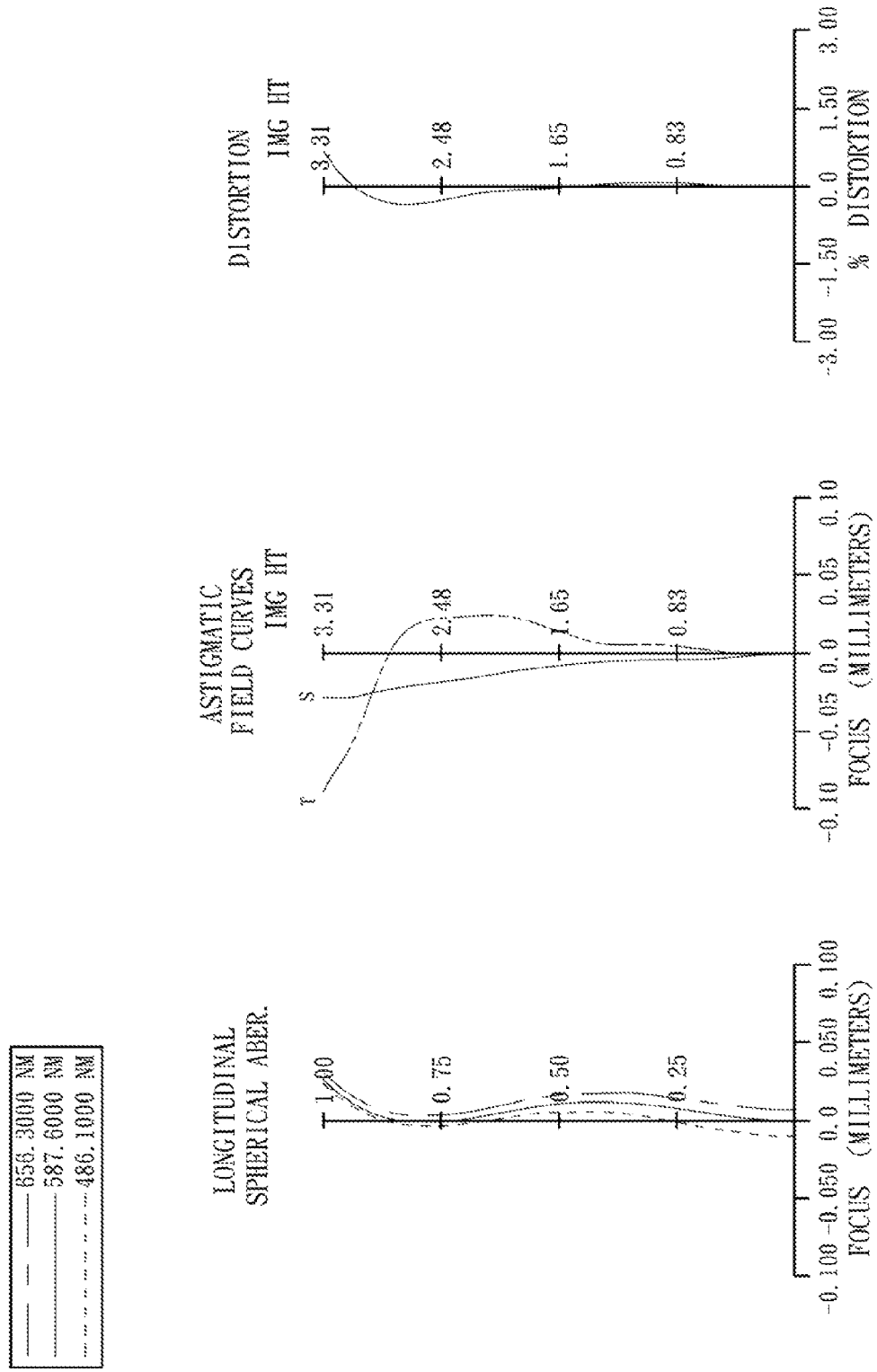
FIG. 4 shows spherical aberration curves, astigmatic field curves and a distortion curve of the image capturing lens assembly according to the second embodiment.

FIG. 3 is a schematic view of an image capturing lens assembly according to the second embodiment of the present disclosure. FIG. 4 shows spherical aberration curves, astigmatic field curves and a distortion curve of the image capturing lens assembly according to the second embodiment. In FIG. 3, the image capturing lens assembly includes, in order from an object side to an image side, the first lens element 210, an aperture stop 200, the second lens element 220, the third lens element 230, the fourth lens element 240, an IR (infrared) cut filter 260 and an image plane 250.

The first lens element 210 is made of plastic material. The first lens element 210 with positive refractive power has a convex object-side surface 211 and a convex image-side surface 212. The object-side surface 211 and the image-side surface 212 of the first lens element 210 are aspheric.

The second lens element 220 is made of plastic material. The second lens element 220 with negative refractive power has a concave object-side surface 221 and a concave image-side surface 222. The object-side surface 221 and the image-side surface 222 of the second lens element 220 are aspheric. Furthermore, the second lens element 220 has inflection points formed on the image-side surface 222 thereof.

The third lens element 230 is made of plastic material. The third lens element 230 with positive refractive power has a concave object-side surface 231 and a convex image-side surface 232. The object-side surface 231 and the image-side surface 232 of the third lens element 230 are aspheric.

The fourth lens element 240 is made of plastic material. The fourth lens element 240 with negative refractive power has a convex object-side surface 241 and a concave image-side surface 242. The object-side surface 241 and the image-side surface 242 of the fourth lens element 240 are aspheric. Furthermore, the fourth lens element 240 has inflection points formed on the object-side surface 241 and the image-side surface 242 thereof.

The IR cut filter 260 is made of glass and located between the fourth lens element 240 and the image plane 250, and will not affect the focal length of the image capturing lens assembly.

The equation of the aspheric surface profiles of the above lens elements of the second embodiment is the same as that of the first embodiment, and will not be stated herein again.

In the image capturing lens assembly according to the second embodiment, the definitions of f, Fno, HFOV, V1, V2, V4, T12, T23, T34, CT1, CT2, CT3, CT4, R1, R2, R3, R4, R5, R6, R7, f1, f2, f3, f4, SD and TD are the same as those stated in the first embodiment with corresponding values for the second embodiment. Moreover, these parameters have the following values and satisfy the following relationships:

| f(mm) | 4.26 | (R3 + R4)/(R3 − R4) | 0.60 |
|---|---|---|---|
| Fno | 2.10 | (R5 + R6)/(R5 − R6) | 1.14 |
| HFOV(deg.) | 37.7 | R7/f | 0.42 |
| V1 − V2 | 32.0 | f/f1 | 0.62 |
| V1 − V2 − V4 | 10.6 | f/f3 | 1.71 |
| (T23 + T34)/T12 | 0.23 | (|f3| + |f4|)/(|f1| + |f2|) | 0.47 |
| (CT1 + CT2 + CT4)/CT3 | 0.63 | SD/TD | 0.85 |
| (R1 + R2)/(R1 − R2) | −0.74 | | |

The detailed optical data of the second embodiment are shown in Table 3 and the aspheric surface data are shown in Table 4 below.

TABLE 3

2nd Embodiment
f = 4.26 mm, Fno = 2.10, HFOV = 37.7 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 4.162500 | (ASP) | 0.782 | Plastic | 1.530 | 55.8 | 6.89 |
| 2 | | −27.777800 | (ASP) | 0.050 | | | | |
| 3 | Ape. Stop | Plano | | 0.849 | | | | |
| 4 | Lens 2 | −22.731600 | (ASP) | 0.300 | Plastic | 1.634 | 23.8 | −7.08 |
| 5 | | 5.617800 | (ASP) | 0.141 | | | | |
| 6 | Lens 3 | −19.921700 | (ASP) | 2.756 | Plastic | 1.544 | 55.9 | 2.49 |
| 7 | | −1.331240 | (ASP) | 0.070 | | | | |
| 8 | Lens 4 | 1.786090 | (ASP) | 0.661 | Plastic | 1.650 | 21.4 | −4.11 |
| 9 | | 0.914310 | (ASP) | 1.400 | | | | |
| 10 | IR-filter | Plano | | 0.700 | Glass | 1.517 | 64.2 | — |
| 11 | | Plano | | 0.253 | | | | |
| 12 | Image | Plano | | — | | | | |

Note:
Reference wavelength (d-line) is 587.6 nm.

TABLE 4

Aspheric Coefficients

| | Surface # | | | |
|---|---|---|---|---|
| | 1 | 2 | 4 | 5 |
| k = | 0.00000E+00 | −1.00000E+00 | 3.11080E+01 | −1.00000E+00 |
| A4 = | −5.12391E−03 | −1.41991E−02 | −1.10414E−01 | −5.10673E−02 |
| A6 = | −8.33553E−04 | −9.90083E−03 | 4.10304E−02 | 1.22074E−02 |
| A8 = | −3.78405E−03 | 2.04421E−03 | −4.14555E−02 | −4.01018E−03 |
| A10 = | 1.27356E−03 | −1.92668E−03 | 1.49994E−02 | 5.16063E−04 |
| A12 = | −5.43890E−04 | 3.66760E−04 | −3.48922E−03 | 4.24312E−05 |

| | Surface # | | | |
|---|---|---|---|---|
| | 6 | 7 | 8 | 9 |
| k = | −6.34039E+01 | −2.78356E+00 | −3.87974E+00 | −2.75964E+00 |
| A4 = | 4.33984E−02 | −2.79889E−02 | −1.22410E−02 | −1.62446E−02 |
| A6 = | −4.70396E−02 | 1.35335E−03 | −3.36194E−04 | 1.45319E−03 |
| A8 = | 3.25884E−02 | 1.39017E−04 | 2.69742E−04 | 1.26345E−04 |
| A10 = | −1.50042E−02 | −1.03406E−04 | −1.53391E−05 | −8.65122E−05 |
| A12 = | 4.23364E−03 | 8.86911E−06 | −8.36237E−06 | 1.40078E−05 |
| A14 = | −6.44911E−04 | 5.70628E−07 | 1.63455E−06 | −1.01680E−06 |
| A16 = | 4.05680E−05 | | −9.20451E−08 | 2.77644E−08 |

Figure 5:
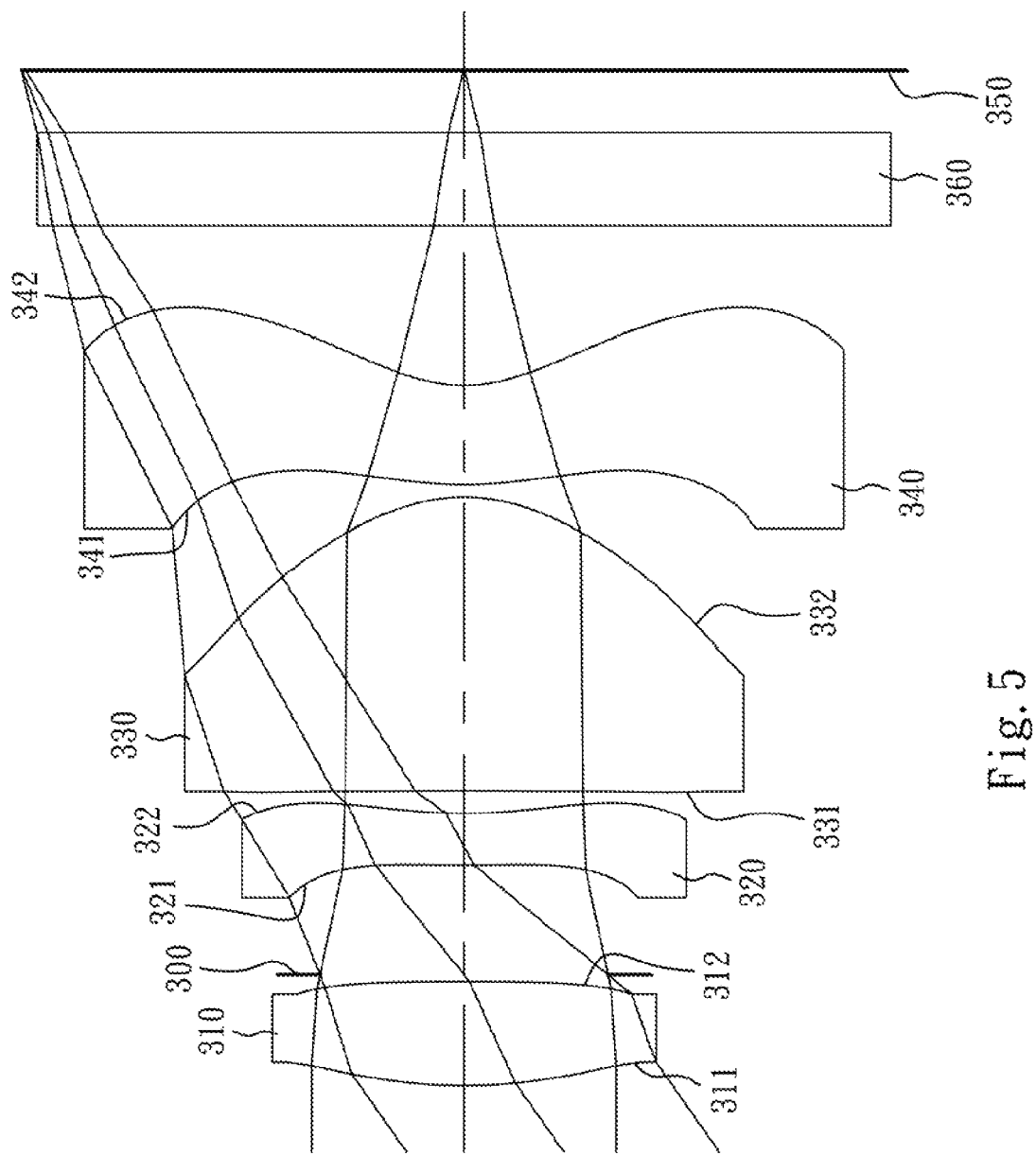
FIG. 5 is a schematic view of an image capturing lens assembly according to the third embodiment of the present disclosure.
Figure 6:
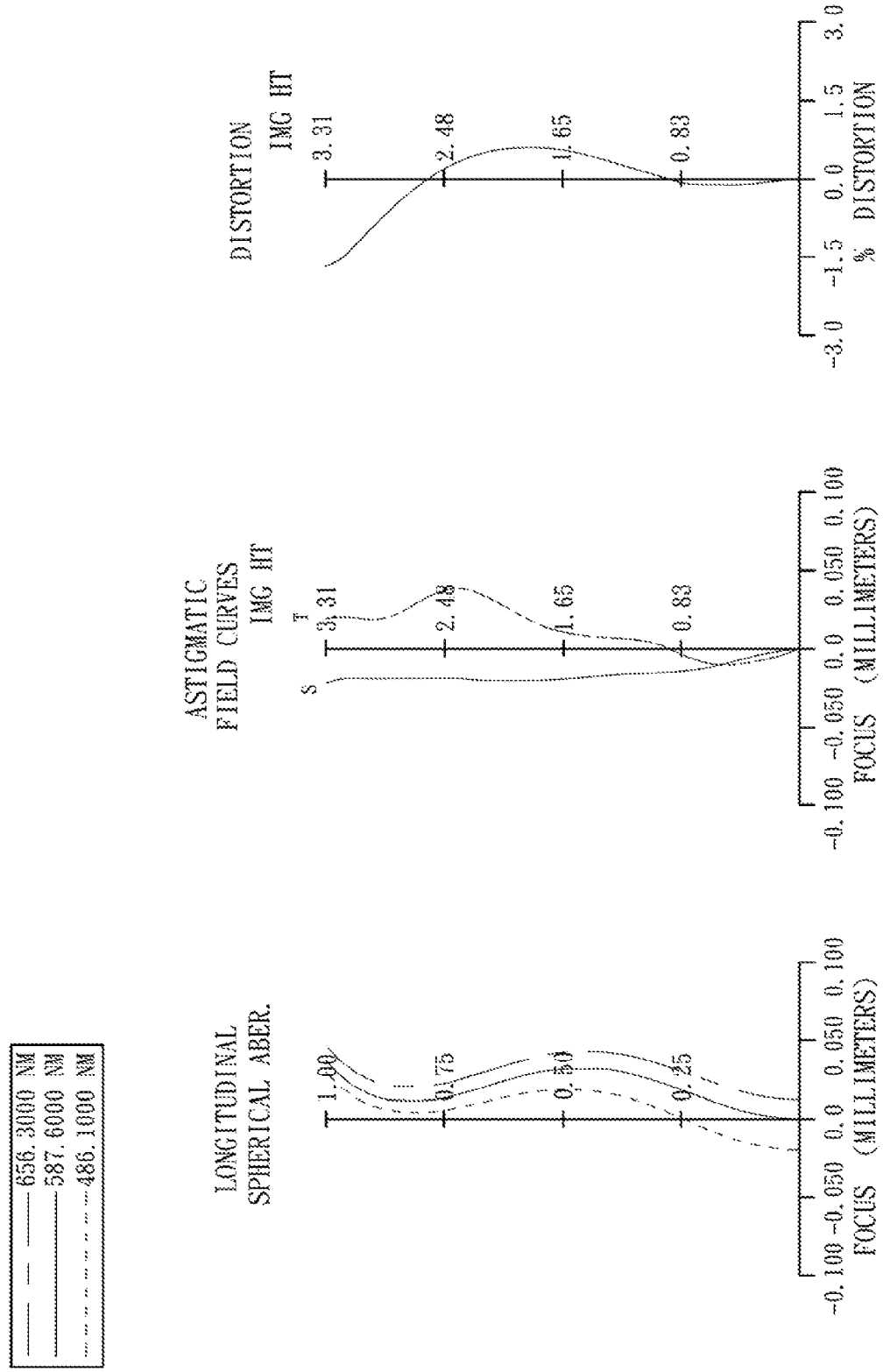
FIG. 6 shows spherical aberration curves, astigmatic field curves and a distortion curve of the image capturing lens assembly according to the third embodiment.

FIG. 5 is a schematic view of an image capturing lens assembly according to the third embodiment of the present disclosure. FIG. 6 shows spherical aberration curves, astigmatic field curves and a distortion curve of the image capturing lens assembly according to the third embodiment. In FIG. 5, the image capturing lens assembly includes, in order from an object side to an image side, the first lens element 310, an aperture stop 300, the second lens element 320, the third lens element 330, the fourth lens element 340, an IR (infrared) cut filter 360 and an image plane 350.

The first lens element 310 is made of plastic material. The first lens element 310 with positive refractive power has a convex object-side surface 311 and a convex image-side surface 312. The object-side surface 311 and the object-side surface 312 of the first lens element 310 are aspheric.

The second lens element 320 is made of plastic material. The second lens element 320 with negative refractive power has a convex object-side surface 321 and a concave image-side surface 322. The object-side surface 321 and the object-side surface 322 of the second lens element 320 are aspheric. Furthermore, the second lens element 320 has inflection points formed on the image-side surface 322 thereof.

The third lens element 330 is made of plastic material. The third lens element 330 with positive refractive power has a concave object-side surface 331 and a convex image-side surface 332. The object-side surface 331 and the image-side surface 332 of the third lens element 330 are aspheric.

The fourth lens element 340 is made of plastic material. The fourth lens element 340 with negative refractive power has a convex object-side surface 341 and a concave image-side surface 342. The object-side surface 341 and the image-side surface 342 of the fourth lens element 340 are aspheric. Furthermore, the fourth lens element 340 has inflection points formed on the object-side surface 341 and the image-side surface 342 thereof.

The IR cut filter 360 is made of glass and located between the fourth lens element 340 and the image plane 350, and will not affect the focal length of the image capturing lens assembly.

The equation of the aspheric surface profiles of the above lens elements of the third embodiment is the same as that of the first embodiment, and will not be stated herein again.

In the image capturing lens assembly according to the third embodiment, the definitions of f, Fno, HFOV, V1, V2, V4, T12, T23, T34, CT1, CT2, CT3, CT4, R1, R2, R3, R4, R5, R6, R7, f1, f2, f3, f4, SD and TD are the same as those stated in the first embodiment with corresponding values for the third embodiment. Moreover, these parameters have the following values and satisfy the following relationships:

| | | | |
|---|---|---|---|
| f (mm) | 4.79 | (R3 + R4)/(R3 − R4) | 1.86 |
| Fno | 2.10 | (R5 + R6)/(R5 − R6) | 1.12 |
| HFOV (deg.) | 35.0 | R7/f | 0.64 |
| V1 − V2 | 34.4 | f/f1 | 0.72 |
| V1 − V2 − V4 | −21.5 | f/f3 | 1.93 |
| (T23 + T34)/T12 | 0.30 | (|f3| + |f4|)/(|f1| + |f2|) | 0.38 |
| (CT1 + CT2 + CT4)/CT3 | 0.87 | SD/TD | 0.84 |
| (R1 + R2)/(R1 − R2) | −0.78 | | |

The detailed optical data of the third embodiment are shown in Table 5 and the aspheric surface data are shown in Table 6 below.

TABLE 5

3rd Embodiment
f = 4.79 mm, Fno = 2.10, HFOV = 35.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 3.946600 (ASP) | 0.780 | Plastic | 1.530 | 55.8 | 6.66 |
| 2 | | −31.250000 (ASP) | 0.050 | | | | |
| 3 | Ape. Stop | Plano | 0.821 | | | | |
| 4 | Lens 2 | 12.500000 (ASP) | 0.393 | Plastic | 1.650 | 21.4 | −8.40 |
| 5 | | 3.751200 (ASP) | 0.170 | | | | |
| 6 | Lens 3 | −23.792100 (ASP) | 2.198 | Plastic | 1.544 | 55.9 | 2.48 |
| 7 | | −1.319880 (ASP) | 0.095 | | | | |
| 8 | Lens 4 | 3.062800 (ASP) | 0.743 | Plastic | 1.544 | 55.9 | −3.27 |
| 9 | | 1.030260 (ASP) | 1.200 | | | | |
| 10 | IR-filter | Plano | 0.700 | Glass | 1.517 | 64.2 | — |
| 11 | | Plano | 0.461 | | | | |
| 12 | Image | Plano | — | | | | |

Note:
Reference wavelength (d-line) is 587.6 nm

TABLE 6

Aspheric Coefficients

| | Surface # | | | |
|---|---|---|---|---|
| | 1 | 2 | 4 | 5 |
| k = | −1.97270E−01 | −1.00000E+00 | −1.00000E+00 | −3.97482E+00 |
| A4 = | −7.33388E−03 | −1.56104E−02 | −1.11832E−01 | −6.31839E−02 |
| A6 = | −1.07196E−03 | −8.19252E−03 | 4.26939E−02 | 1.39280E−02 |
| A8 = | −3.00491E−03 | 2.59569E−03 | −3.86726E−02 | −4.11234E−03 |
| A10 = | 1.17702E−03 | −2.04136E−03 | 1.52964E−02 | 3.21658E−04 |
| A12 = | −5.43890E−04 | 3.66760E−04 | −3.48922E−03 | 4.62439E−06 |

TABLE 6-continued

| Aspheric Coefficients | | | |
|---|---|---|---|
| Surface # | | | |
| 6 | 7 | 8 | 9 |
| k = 8.30000E+01 | −3.11828E+00 | −1.46842E+01 | −3.77578E+00 |
| A4 = 3.81780E−02 | −3.20284E−02 | −3.06491E−02 | −2.68326E−02 |
| A6 = −4.42618E−02 | 1.62350E−03 | −1.60063E−03 | 2.25418E−03 |
| A8 = 3.23748E−02 | 1.83835E−04 | 6.45929E−04 | 1.44495E−04 |
| A10 = −1.50341E−02 | −7.00756E−05 | 1.41811E−05 | −9.20982E−05 |
| A12 = 4.23539E−03 | 1.73210E−05 | −1.36466E−05 | 1.31228E−05 |
| A14 = −6.45928E−04 | 5.54363E−07 | 1.99732E−07 | −9.86069E−07 |
| A16 = 4.10478E−05 | | −3.14882E−07 | 3.18006E−08 |

Figure 7:
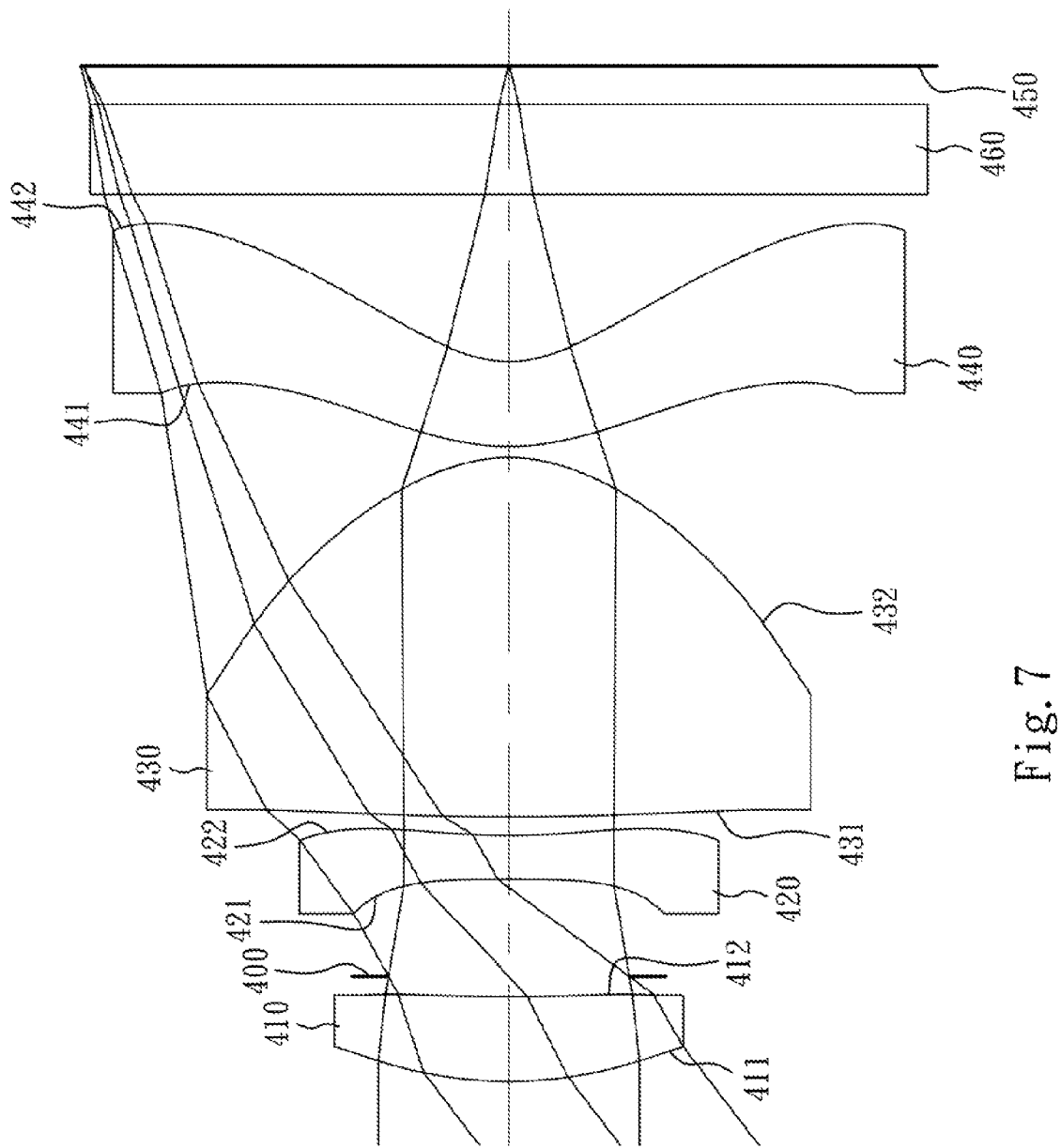
FIG. 7 is a schematic view of an image capturing lens assembly according to the fourth embodiment of the present disclosure.
Figure 8:
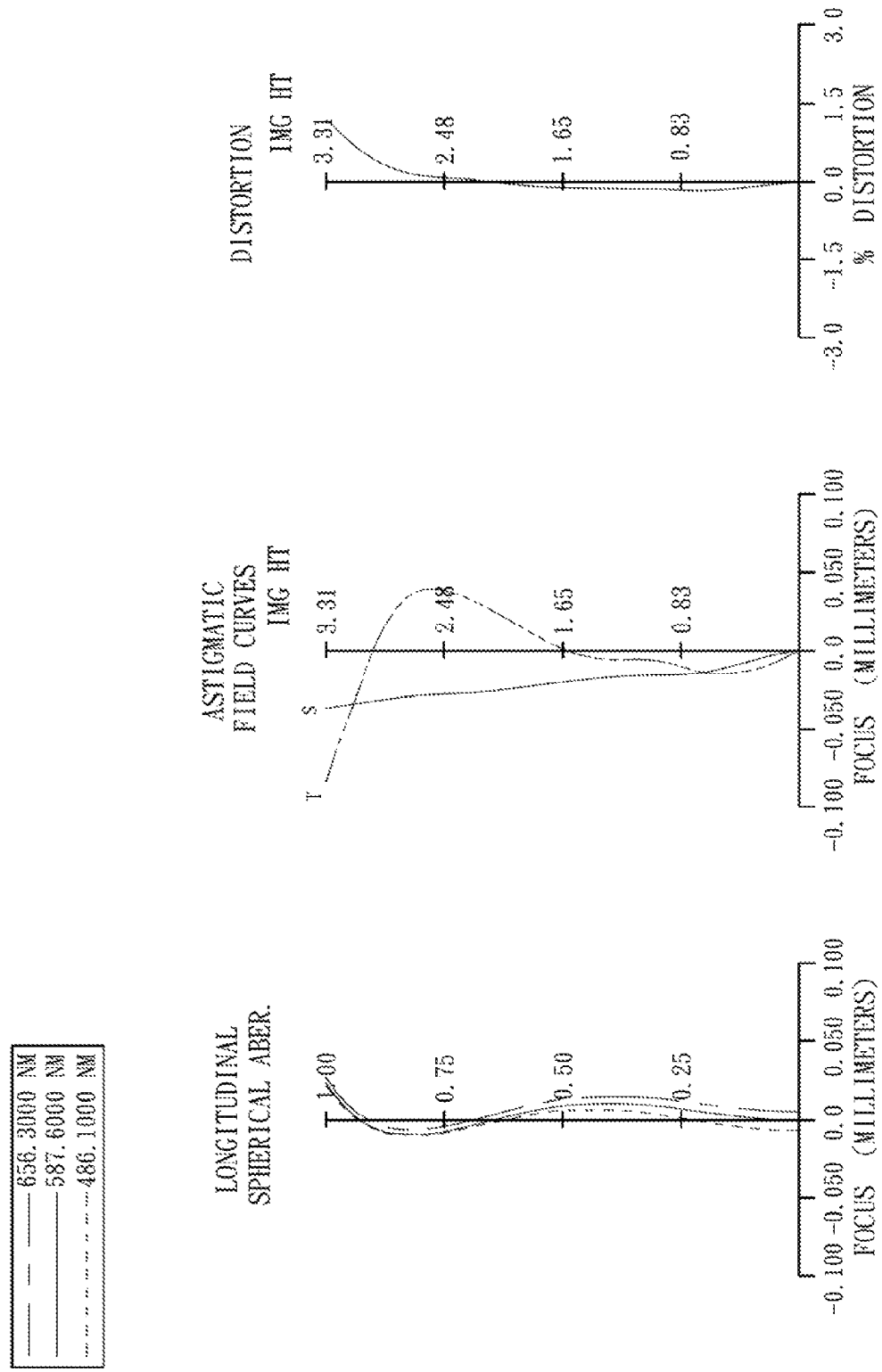
FIG. 8 shows spherical aberration curves, astigmatic field curves and a distortion curve of the image capturing lens assembly according to the fourth embodiment.

FIG. 7 is a schematic view of an image capturing lens assembly according to the fourth embodiment of the present disclosure. FIG. 8 shows spherical aberration curves, astigmatic field curves and a distortion curve of the image capturing lens assembly according to the fourth embodiment. In FIG. 7, the image capturing lens assembly includes, in order from an object side to an image side, the first lens element 410, an aperture stop 400, the second lens element 420, the third lens element 430, the fourth lens element 440, an IR (infrared) cut filter 460 and an image plane 450.

The first lens element 410 is made of plastic material. The first lens element 410 with positive refractive power has a convex object-side surface 411 and a concave image-side surface 412. The object-side surface 411 and the object-side surface 412 of the first lens element 410 are aspheric.

The second lens element 420 is made of plastic material. The second lens element 420 with negative refractive power has a concave object-side surface 421 and a concave image-side surface 422. The object-side surface 421 and the object-side surface 422 of the second lens element 420 are aspheric. Furthermore, the second lens element 420 has inflection points formed on the image-side surface 422 thereof.

The third lens element 430 is made of plastic material. The third lens element 430 with positive refractive power has a convex object-side surface 431 and a convex image-side surface 432. The object-side surface 431 and the image-side surface 432 of the third lens element 430 are aspheric.

The fourth lens element 440 is made of plastic material. The fourth lens element 440 with negative refractive power has a convex object-side surface 441 and a concave image-side surface 442. The object-side surface 441 and the image-side surface 442 of the fourth lens element 440 are aspheric. Furthermore, the fourth lens element 440 has inflection points formed on the object-side surface 441 and the image-side surface 442 thereof.

The IR cut filter 460 is made of glass and located between the fourth lens element 440 and the image plane 450, and will not affect the focal length of the image capturing lens assembly.

The equation of the aspheric surface profiles of the above lens elements of the fourth embodiment is the same as that of the first embodiment, and will not be stated herein again.

In the image capturing lens assembly according to the fourth embodiment, the definitions of f, Fno, HFOV, V1, V2, V4, T12, T23, T34, CT1, CT2, CT3, CT4, R1, R2, R3, R4, R5, R6, R7, f1, f2, f3, f4, SD and TD are the same as those stated in the first embodiment with corresponding values for the fourth embodiment. Moreover, these parameters have the following values and satisfy the following relationships:

| | | | |
|---|---|---|---|
| f (mm) | 4.27 | (R3 + R4)/(R3 − R4) | 0.73 |
| Fno | 2.10 | (R5 + R6)/(R5 − R6) | 0.97 |
| HFOV (deg.) | 37.4 | R7/f | 0.44 |
| V1 − V2 | 32.4 | f/f1 | 0.56 |
| V1 − V2 − V4 | 9.0 | f/f3 | 1.78 |
| (T23 + T34)/T12 | 0.26 | (|f3| + |f4|)/(|f1| + |f2|) | 0.42 |
| (CT1 + CT2 + CT4)/CT3 | 0.59 | SD/TD | 0.85 |
| (R1 + R2)/(R1 − R2) | −1.45 | | |

The detailed optical data of the fourth embodiment are shown in Table 7 and the aspheric surface data are shown in Table 8 below.

TABLE 7

4th Embodiment
f = 4.27 mm, Fno = 2.10, HFOV = 37.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 3.345500 (ASP) | 0.664 | Plastic | 1.530 | 55.8 | 7.61 |
| 2 | | 18.258200 (ASP) | 0.153 | | | | |
| 3 | Ape. Stop | Plano | 0.762 | | | | |
| 4 | Lens 2 | −32.832000 (ASP) | 0.336 | Plastic | 1.633 | 23.4 | −6.86 |
| 5 | | 5.021600 (ASP) | 0.147 | | | | |
| 6 | Lens 3 | 73.124100 (ASP) | 2.800 | Plastic | 1.530 | 55.8 | 2.40 |
| 7 | | −1.274600 (ASP) | 0.087 | | | | |
| 8 | Lens 4 | 1.861140 (ASP) | 0.665 | Plastic | 1.633 | 23.4 | −3.71 |
| 9 | | 0.894110 (ASP) | 1.300 | | | | |
| 10 | IR-filter | Plano | 0.700 | Glass | 1.517 | 64.2 | — |
| 11 | | Plano | 0.297 | | | | |
| 12 | Image | Plano | — | | | | |

Note:
Reference wavelength (d-line) is 587.6 nm.

TABLE 8

Aspheric Coefficients

| Surface # | 1 | 2 | 4 | 5 |
|---|---|---|---|---|
| k = | 0.00000E+00 | −1.00000E+00 | −1.00000E+00 | −1.00000E+00 |
| A4 = | 1.88382E−03 | −2.37850E−03 | −1.07945E−01 | −5.66326E−02 |
| A6 = | 2.24706E−03 | −9.57198E−03 | 3.51760E−02 | 1.41041E−02 |
| A8 = | −3.67405E−03 | 1.75200E−03 | −3.29252E−02 | −4.96038E−03 |
| A10 = | 1.17048E−03 | −2.00168E−03 | 8.19437E−03 | 5.07610E−04 |
| A12 = | −5.43890E−04 | 3.66760E−04 | −3.48922E−03 | 4.24308E−05 |

| Surface # | 6 | 7 | 8 | 9 |
|---|---|---|---|---|
| k = | −8.30000E+01 | −2.82353E+00 | −4.18499E+00 | −2.80751E+00 |
| A4 = | 3.68427E−02 | −2.82007E−02 | −1.20293E−02 | −1.47932E−02 |
| A6 = | −4.47081E−02 | 1.37607E−03 | −7.62814E−04 | 8.95388E−04 |
| A8 = | 3.23636E−02 | 1.25708E−04 | 3.07650E−04 | 2.14323E−04 |
| A10 = | −1.51021E−02 | −1.00206E−04 | −1.87004E−05 | −9.03545E−05 |
| A12 = | 4.24611E−03 | 1.15157E−05 | −7.88863E−06 | 1.36069E−05 |
| A14 = | −6.44904E−04 | 1.85799E−07 | 1.66461E−06 | −9.70290E−07 |
| A16 = | 4.05680E−05 |  | −1.01256E−07 | 2.64401E−08 |

Figure 9:
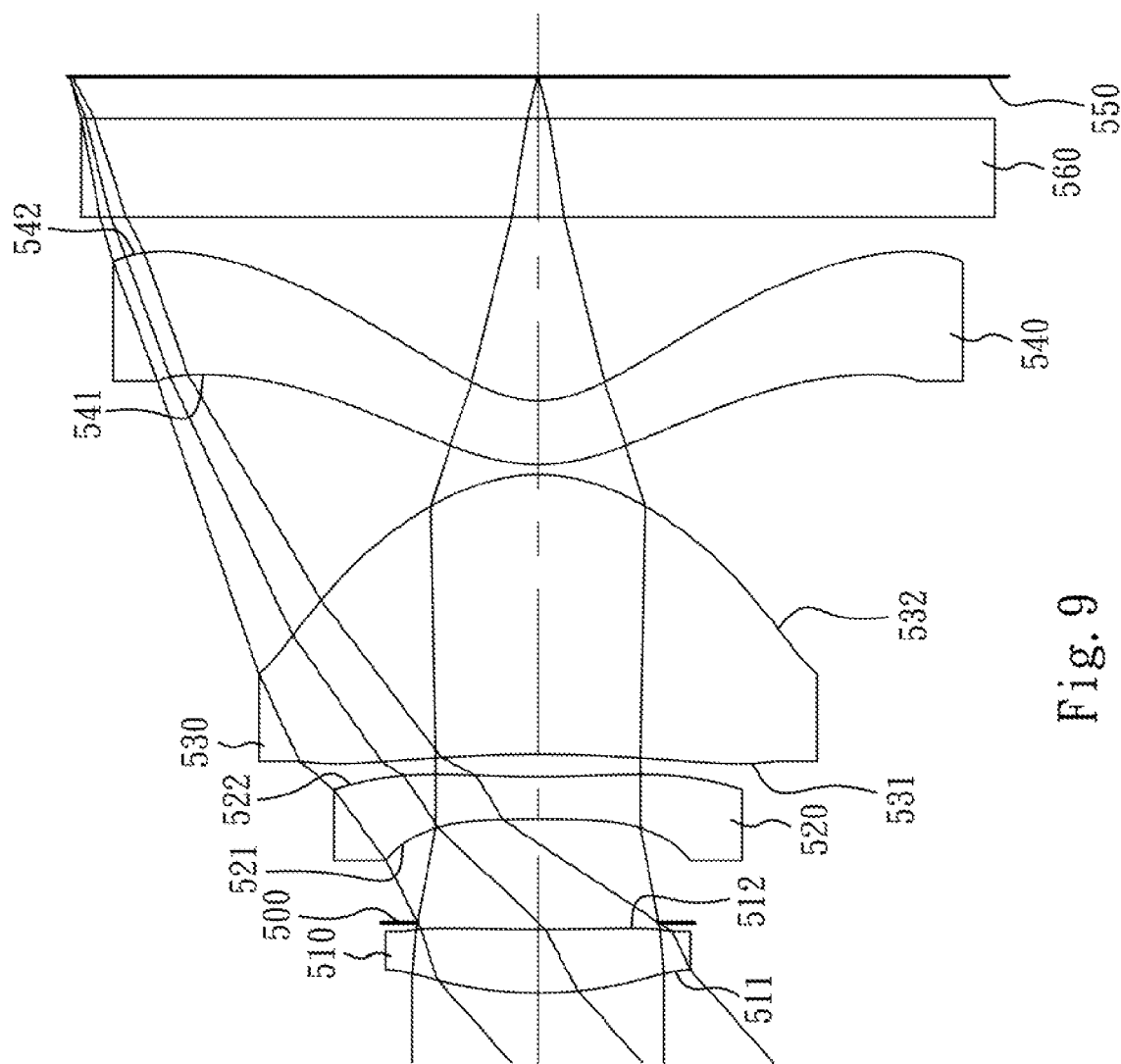
FIG. 9 is a schematic view of an image capturing lens assembly according to the fifth embodiment of the present disclosure.
Figure 10:
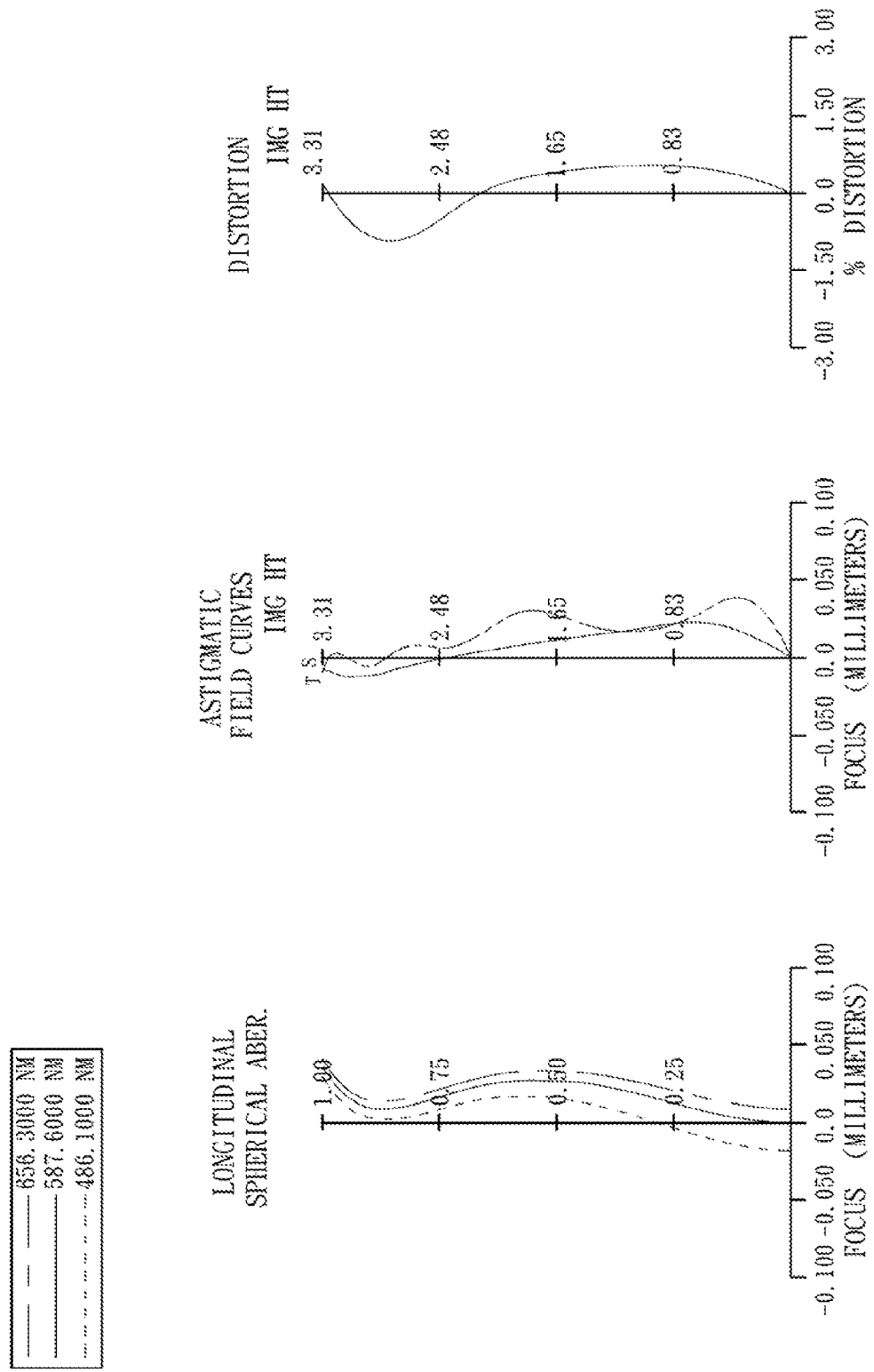
FIG. 10 shows spherical aberration curves, astigmatic field curves and a distortion curve of the image capturing lens assembly according to the fifth embodiment.

FIG. 9 is a schematic view of an image capturing lens assembly according to the fifth embodiment of the present disclosure. FIG. 10 shows spherical aberration curves, astigmatic field curves and a distortion curve of the image capturing lens assembly according to the fifth embodiment. In FIG. 9, the image capturing lens assembly includes, in order from an object side to an image side, the first lens element 510, an aperture stop 500, the second lens element 520, the third lens element 530, the fourth lens element 540, an IR (infrared) cut filter 560 and an image plane 550.

The first lens element 510 is made of plastic material. The first lens element 510 with positive refractive power has a convex object-side surface 511 and a concave image-side surface 512. The object-side surface 511 and the image-side surface 512 of the first lens element 510 are aspheric.

The second lens element 520 is made of plastic material. The second lens element 520 with negative refractive power has a concave object-side surface 521 and a concave image-side surface 522. The object-side surface 521 and the image-side surface 522 of the second lens element 520 are aspheric. Furthermore, the second lens element 520 has inflection points formed on the image-side surface 522 thereof.

The third lens element 530 is made of plastic material. The third lens element 530 with positive refractive power has a concave object-side surface 531 and a convex image-side surface 532. The object-side surface 531 and the image-side surface 532 of the third lens element 530 are aspheric.

The fourth lens element 540 is made of plastic material. The fourth lens element 540 with negative refractive power has a convex object-side surface 541 and a concave image-side surface 542. The object-side surface 541 and the image-side surface 542 of the fourth lens element 540 are aspheric. Furthermore, the fourth lens element 540 has inflection points formed on the object-side surface 541 and the image-side surface 542 thereof.

The IR cut filter 560 is made of glass and located between the fourth lens element 540 and the image plane 550, and will not affect the focal length of the image capturing lens assembly.

The equation of the aspheric surface profiles of the above lens elements of the fifth embodiment is the same as that of the first embodiment, and will not be stated herein again.

In the image capturing lens assembly according to the fifth embodiment, the definitions of f, Fno, HFOV, V1, V2, V4, T12, T23, T34, CT1, CT2, CT3, CT4, R1, R2, R3, R4, R5, R6, R7, f1, f2, f3, f4, SD and TD are the same as those stated in the first embodiment with corresponding values for the fifth embodiment. Moreover, these parameters have the following values and satisfy the following relationships:

| f (mm) | 3.73 | (R3 + R4)/(R3 − R4) | 0.31 |
|---|---|---|---|
| Fno | 2.10 | (R5 + R6)/(R5 − R6) | 1.34 |
| HFOV (deg.) | 41.5 | R7/f | 0.32 |
| V1 − V2 | 32.9 | f/f1 | 0.61 |
| V1 − V2 − V4 | 9.5 | f/f3 | 1.62 |
| (T23 + T34)/T12 | 0.29 | (|f3| + |f4|)/(|f1| + |f2|) | 0.46 |
| (CT1 + CT2 + CT4)/CT3 | 0.60 | SD/TD | 0.88 |
| (R1 + R2)/(R1 − R2) | −1.44 | | |

The detailed optical data of the fifth embodiment are shown in Table 9 and the aspheric surface data are shown in Table 10 below.

TABLE 9

5th Embodiment
f = 3.73 mm, Fno = 2.10, HFOV = 41.5 deg.

| Surface # |  | Curvature Radius | Thickness | Material | Index | Abbe # | Focal length |
|---|---|---|---|---|---|---|---|
| 0 | Object | Plano | Infinity | | | | |
| 1 | Lens 1 | 2.736500 (ASP) | 0.443 | Plastic | 1.535 | 56.3 | 6.17 |
| 2 |  | 15.205900 (ASP) | 0.050 | | | | |
| 3 | Ape. Stop | Plano | 0.730 | | | | |

TABLE 9-continued

5th Embodiment
f = 3.73 mm, Fno = 2.10, HFOV = 41.5 deg.

| Surface # | | Curvature Radius | Thickness | Material | Index | Abbe # | Focal length |
|---|---|---|---|---|---|---|---|
| 4 | Lens 2 | −13.978000 (ASP) | 0.300 | Plastic | 1.633 | 23.4 | −7.63 |
| 5 | | 7.443400 (ASP) | 0.159 | | | | |
| 6 | Lens 3 | −7.907200 (ASP) | 1.983 | Plastic | 1.535 | 56.3 | 2.31 |
| 7 | | −1.160230 (ASP) | 0.070 | | | | |
| 8 | Lens 4 | 1.202640 (ASP) | 0.446 | Plastic | 1.633 | 23.4 | −4.08 |
| 9 | | 0.702450 (ASP) | 1.300 | | | | |
| 10 | IR-filter | Plano | 0.700 | Glass | 1.517 | 64.2 | — |
| 11 | | Plano | 0.291 | | | | |
| 12 | Image | Plano | — | | | | |

Note:
Reference wavelength (d-line) 587.6 nm.

TABLE 10

Aspheric Coefficients

| | Surface # | | | |
|---|---|---|---|---|
| | 1 | 2 | 4 | 5 |
| k = | −4.46832E−01 | −4.30000E+01 | 4.30000E+01 | −5.73519E+01 |
| A4 = | 3.91927E−03 | −2.16910E−02 | −1.44944E−01 | −6.38870E−02 |
| A6 = | −3.15557E−02 | −2.01372E−02 | 1.14304E−02 | 1.57988E−02 |
| A8 = | 3.05585E−02 | −1.19150E−02 | −2.57621E−02 | −5.55882E−02 |
| A10 = | −2.87301E−02 | −5.20040E−03 | −7.47488E−03 | 1.12494E−03 |
| A12 = | −5.43890E−04 | 3.66760E−04 | −3.48922E−03 | 4.24126E−05 |

| | Surface # | | | |
|---|---|---|---|---|
| | 6 | 7 | 8 | 9 |
| k = | −4.79981E+00 | −2.42840E+00 | −4.38765E+00 | −2.74142E+00 |
| A4 = | 3.70129E−02 | −3.38933E−02 | −6.12725E−03 | −1.84274E−02 |
| A6 = | −4.09632E−02 | 1.24292E−03 | −3.53067E−03 | 1.13967E−03 |
| A8 = | 3.26666E−02 | −3.87960E−04 | 6.21667E−04 | 1.44613E−04 |
| A10 = | −1.51638E−02 | −1.94819E−04 | 4.68332E−06 | −7.95838E−05 |
| A12 = | 4.25083E−03 | 3.59100E−05 | −1.10846E−05 | 1.45672E−05 |
| A14 = | −6.44902E−04 | 1.41640E−05 | 1.38917E−06 | −1.22414E−06 |
| A16 = | 4.05680E−05 | | −7.38595E−08 | 3.73632E−08 |

Figure 11:
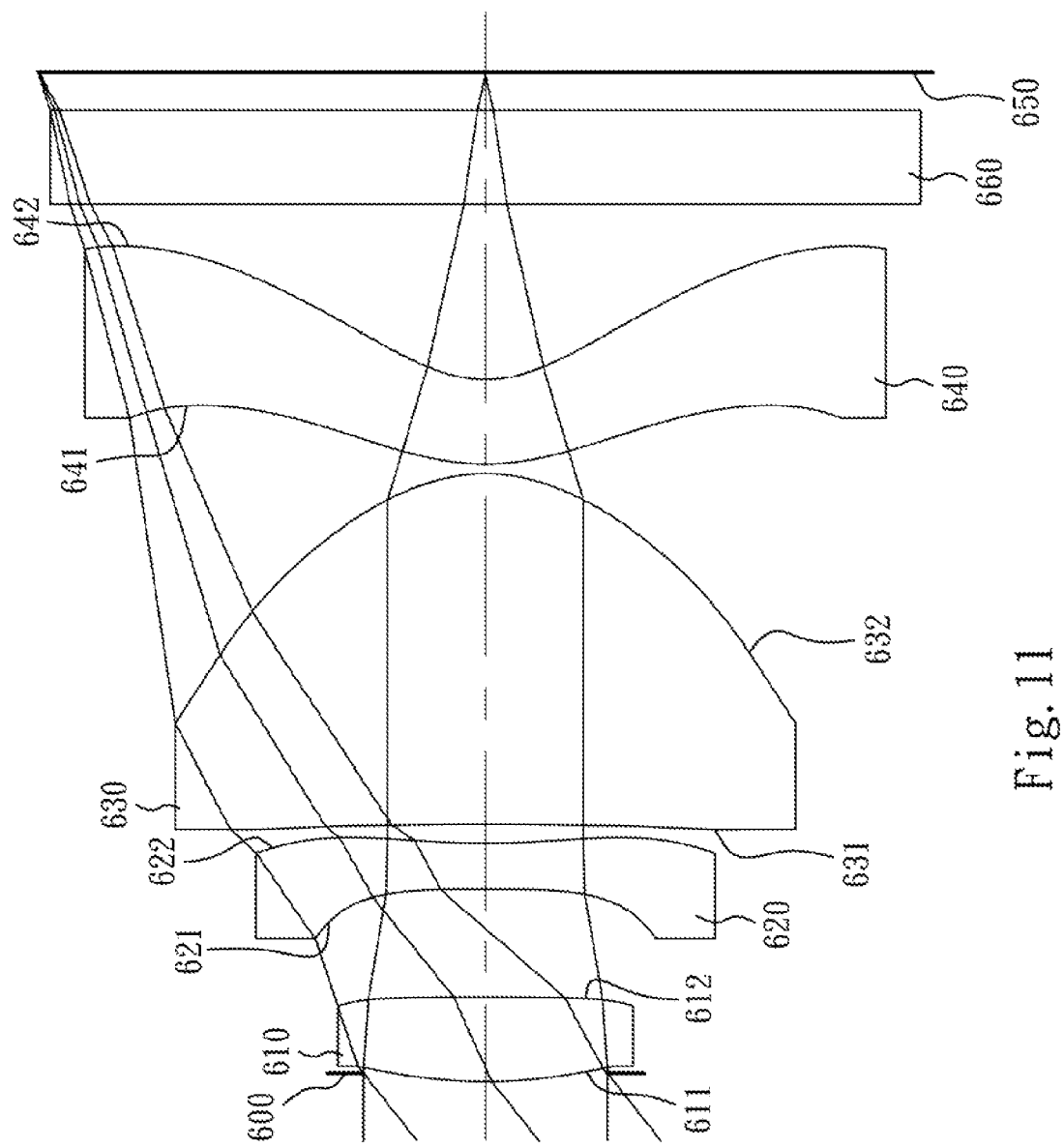
FIG. 11 is a schematic view of an image capturing lens assembly according to the sixth embodiment of the present disclosure.
Figure 12:
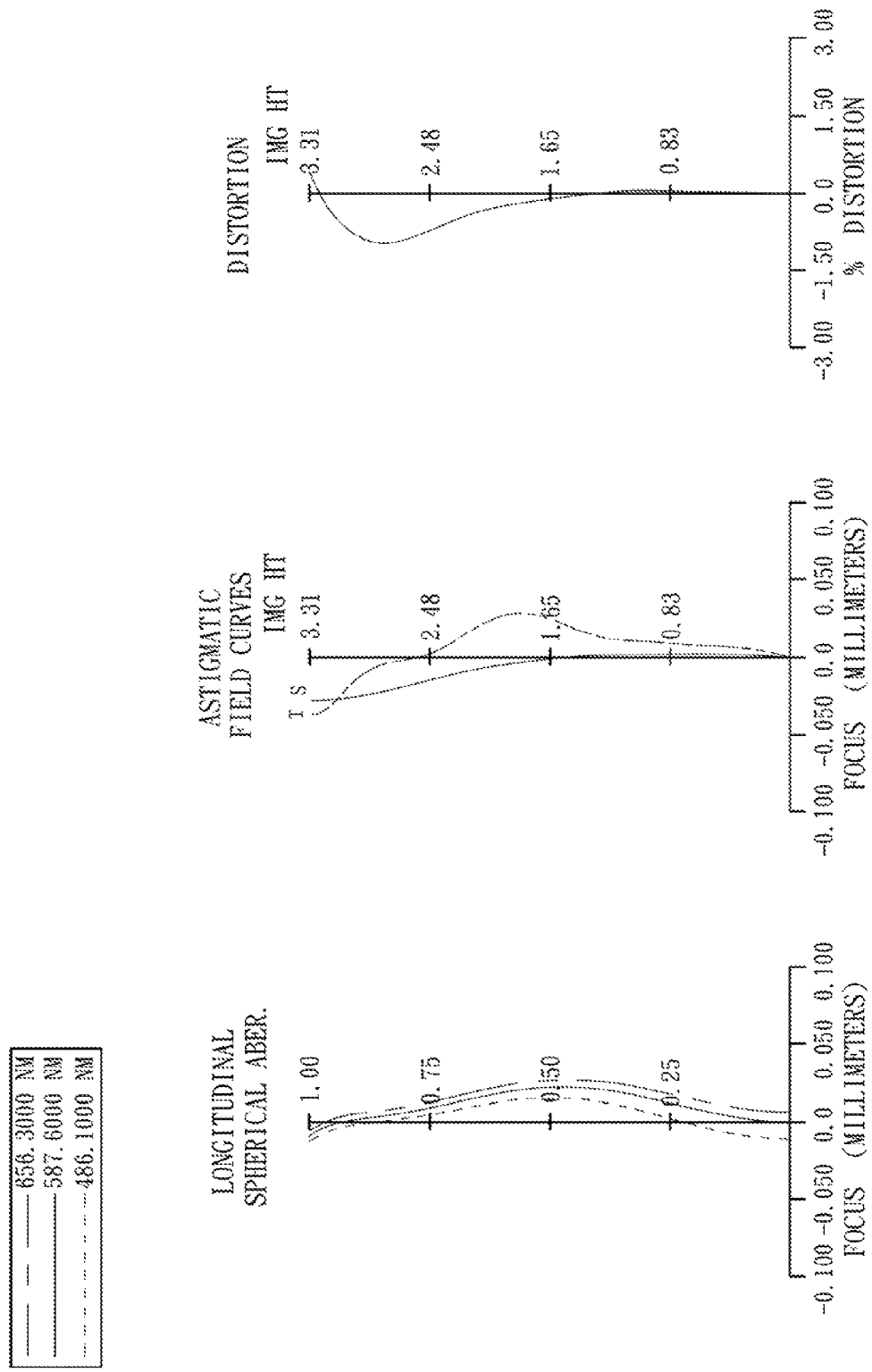
FIG. 12 shows spherical aberration curves, astigmatic field curves and a distortion curve of the image capturing lens assembly according to the sixth embodiment.

FIG. 11 is a schematic view of an image capturing lens assembly according to the sixth embodiment of the present disclosure. FIG. 12 shows spherical aberration curves, astigmatic field curves and a distortion curve of the image capturing lens assembly according to the sixth embodiment. In FIG. 11, the image capturing lens assembly includes, in order from an object side to an image side, an aperture stop 600, the first lens element 610, the second lens element 620, the third lens element 630, the fourth lens element 640, an IR (infrared) cut filter 660 and an image plane 650.

The first lens element 610 is made of plastic material. The first lens element 610 with positive refractive power has a convex object-side surface 611 and a convex image-side surface 612. The object-side surface 611 and the image-side surface 612 of the first lens element 610 are aspheric.

The second lens element 620 is made of plastic material. The second lens element 620 with negative refractive power has a concave object-side surface 621 and a concave image-side surface 622. The object-side surface 621 and the image-side surface 622 of the second lens element 620 are aspheric. Furthermore, the second lens element 620 has inflection points formed on the image-side surface 622 thereof.

The third lens element 630 is made of plastic material. The third lens element 630 with positive refractive power has a concave object-side surface 631 and a convex image-side surface 632. The object-side surface 631 and the image-side surface 632 of the third lens element 630 are aspheric.

The fourth lens element 640 is made of plastic material. The fourth lens element 640 with negative refractive power has a convex object-side surface 641 and a concave image-side surface 642. The object-side surface 641 and the image-side surface 642 of the fourth lens element 640 are aspheric. Furthermore, the fourth lens element 640 has inflection points formed on the object-side surface 641 and the image-side surface 642 thereof.

The IR cut filter 660 is made of glass and located between the fourth lens element 640 and the image plane 650, and will not affect the focal length of the image capturing lens assembly.

The equation of the aspheric surface profiles of the above lens elements of the sixth embodiment is the same as that of the first embodiment, and will not be stated herein again.

In the image capturing lens assembly according to the sixth embodiment, the definitions of f, Fno, HFOV, V1, V2, V4, T12, T23, T34, CT1, CT2, CT3, CT4, R1, R2, R3, R4, R5, R6, R7, f1, f2, f3, f4, SD and TD are the same as those stated in the first embodiment with corresponding values for the sixth embodiment. Moreover, these parameters have the following values and satisfy the following relationships:

| | | | |
|---|---|---|---|
| f (mm) | 4.15 | (R3 + R4)/(R3 − R4) | 0.81 |
| Fno | 2.30 | (R5 + R6)/(R5 − R6) | 1.13 |
| HFOV (deg.) | 38.4 | R7/f | 0.41 |
| V1 − V2 | 32.5 | f/f1 | 0.62 |
| V1 − V2 − V4 | 9.1 | f/f3 | 1.75 |
| (T23 + T34)/T12 | 0.26 | (|f3| + |f4|)/(|f1| + |f2|) | 0.41 |
| (CT1 + CT2 + CT4)/CT3 | 0.61 | SD/TD | 0.99 |
| (R1 + R2)/(R1 − R2) | −0.94 | | |

The detailed optical data of the sixth embodiment are shown in Table 11 and the aspheric surface data are shown in Table 12 below.

TABLE 11

6th Embodiment
f = 4.15 mm, Fno = 2.30, HFOV = 38.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.060 | | | | |
| 2 | Lens 1 | 3.701300 (ASP) | 0.625 | Plastic | 1.535 | 56.3 | 6.74 |
| 3 | | −127.513800 (ASP) | 0.802 | | | | |
| 4 | Lens 2 | −50.000000 (ASP) | 0.338 | Plastic | 1.634 | 23.8 | −7.54 |
| 5 | | 5.299300 (ASP) | 0.141 | | | | |
| 6 | Lens 3 | −20.438000 (ASP) | 2.600 | Plastic | 1.535 | 56.3 | 2.37 |
| 7 | | −1.244430 (ASP) | 0.070 | | | | |
| 8 | Lens 4 | 1.707060 (ASP) | 0.627 | Plastic | 1.633 | 23.4 | −3.55 |
| 9 | | 0.832350 (ASP) | 1.300 | | | | |
| 10 | IR-filter | Plano | 0.700 | Glass | 1.517 | 64.2 | — |
| 11 | | Plano | 0.280 | | | | |
| 12 | Image | Plano | — | | | | |

Note:
Reference wavelength (d-line) 587.6 nm.

TABLE 12

Aspheric Coefficients

| | Surface # | | | |
|---|---|---|---|---|
| | 2 | 3 | 4 | 5 |
| k = | −1.69729E+00 | 4.30000E+01 | 4.30000E+01 | −5.15069E+00 |
| A4 = | −3.10426E−03 | −1.77131E−02 | −1.14398E−01 | −5.83971E−02 |
| A6 = | −1.13801E−03 | −2.18669E−02 | 3.10070E−02 | 1.54853E−02 |
| A8 = | −5.59346E−03 | 1.42787E−02 | −3.54368E−02 | −5.44477E−03 |
| A10 = | −3.25973E−04 | −1.17167E−02 | 9.27282E−03 | 7.42262E−04 |
| A12 = | −5.43890E−04 | 3.66760E−04 | −3.48922E−03 | 4.24129E−05 |

| | Surface # | | | |
|---|---|---|---|---|
| | 6 | 7 | 8 | 9 |
| k = | 4.30000E+01 | −2.72266E+00 | −4.96185E+00 | −2.83005E+00 |
| A4 = | 3.40725E−02 | −3.02934E−02 | −1.41509E−02 | −2.10876E−02 |
| A6 = | −4.30621E−02 | 1.43058E−03 | −1.45168E−03 | 2.02945E−03 |
| A8 = | 3.23436E−02 | 2.65565E−05 | 4.96091E−04 | 1.24823E−04 |
| A10 = | −1.51513E−02 | −1.09156E−04 | −1.71084E−05 | −9.09038E−05 |
| A12 = | 4.25721E−03 | 1.51511E−05 | −9.81991E−06 | 1.44428E−05 |
| A14 = | −6.44902E−04 | 4.39018E−07 | 1.54383E−06 | −1.05308E−06 |
| A16 = | 4.05680E−05 | | −7.96244E−08 | 3.01432E−08 |

Figure 13:
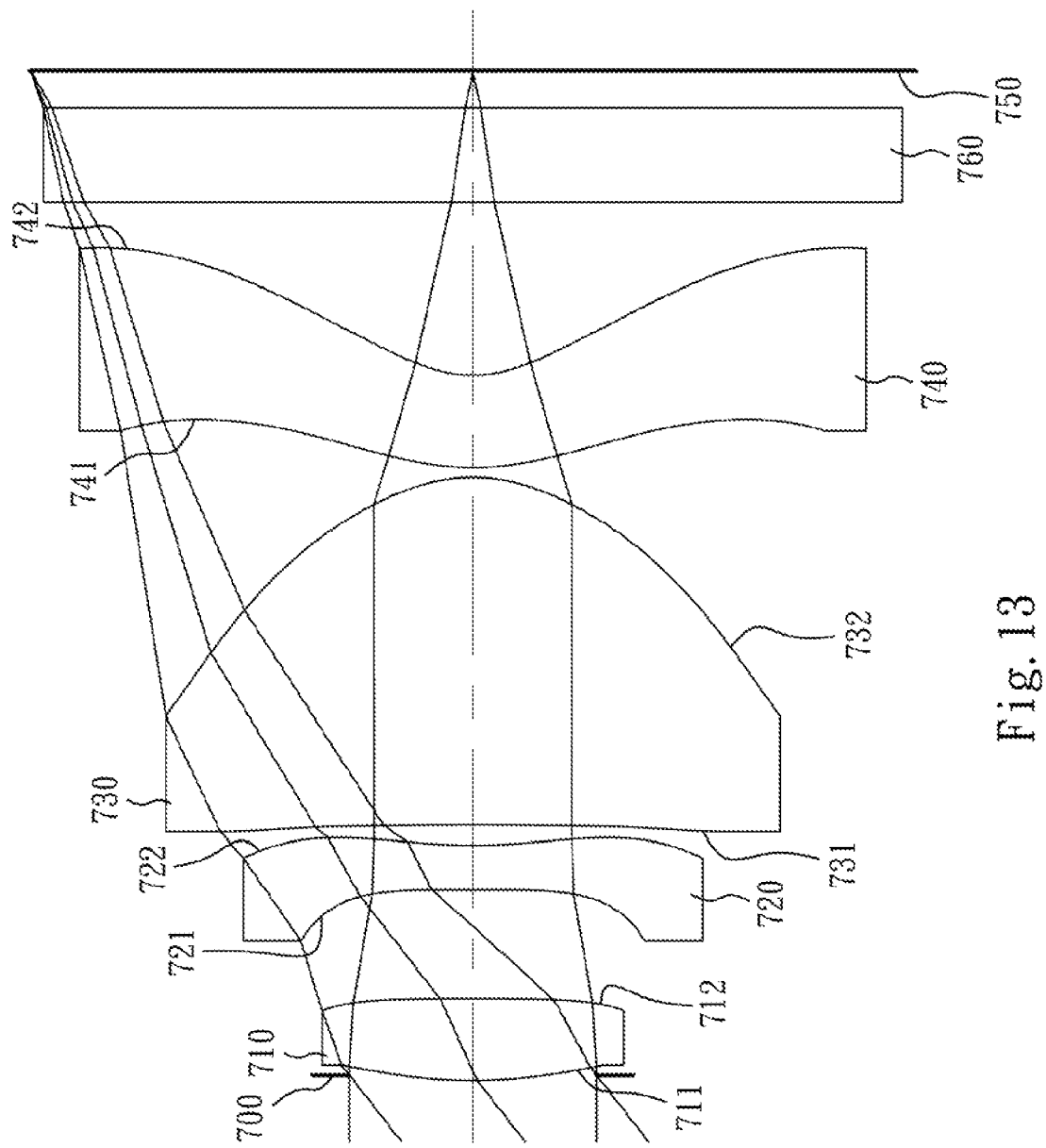
FIG. 13 is a schematic view of an image capturing lens assembly according to the seventh embodiment of the present disclosure.
Figure 14:
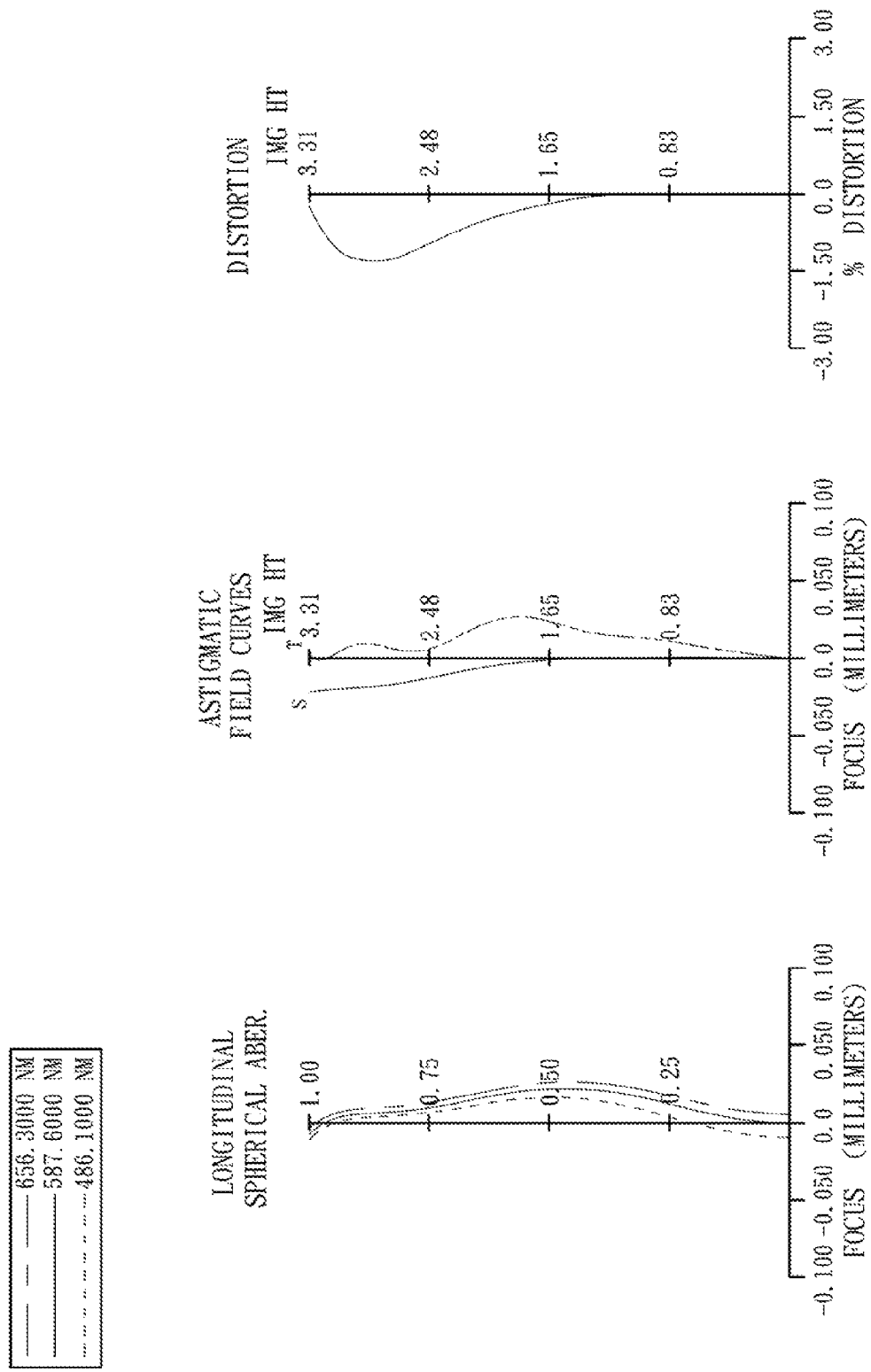
FIG. 14 shows spherical aberration curves, astigmatic field curves and a distortion curve of the image capturing lens assembly according to the seventh embodiment.

FIG. 13 is a schematic view of an image capturing lens assembly according to the seventh embodiment of the present disclosure. FIG. 14 shows spherical aberration curves, astigmatic field curves and a distortion curve of the image capturing lens assembly according to the seventh embodiment. In FIG. 13, the image capturing lens assembly includes, in order from an object side to an image side, an aperture stop 700, the first lens element 710, the second lens element 720, the third lens element 730, the fourth lens element 740, an IR (infrared) cut filter 760 and an image plane 750.

The first lens element 710 is made of plastic material. The first lens element 710 with positive refractive power has a convex object-side surface 711 and a convex image-side surface 712. The object-side surface 711 and the image-side surface 712 of the first lens element 710 are aspheric.

The second lens element 720 is made of plastic material. The second lens element 720 with negative refractive power has a convex object-side surface 721 and a concave image-side surface 722. The object-side surface 721 and the image-side surface 722 of the second lens element 720 are aspheric.

Furthermore, the second lens element 720 has inflection points formed on the image-side surface 722 thereof.

The third lens element 730 is made of plastic material. The third lens element 730 with positive refractive power has a concave object-side surface 731 and a convex image-side surface 732. The object-side surface 731 and the image-side surface 732 of the third lens element 730 are aspheric.

The fourth lens element 740 is made of plastic material. The fourth lens element 740 with negative refractive power has a convex object-side surface 741 and a concave image-side surface 742. The object-side surface 741 and the image-side surface 742 of the fourth lens element 740 are aspheric. Furthermore, the fourth lens element 740 has inflection points formed on the object-side surface 741 and the image-side surface 742 thereof.

The IR cut filter 760 is made of glass and located between the fourth lens element 740 and the image plane 750, and will not affect the focal length of the image capturing lens assembly.

The equation of the aspheric surface profiles of the above lens elements of the seventh embodiment is the same as that of the first embodiment, and will not be stated herein again.

In the image capturing lens assembly according to the seventh embodiment, the definitions of f, Fno, HFOV, V1, V2, V4, T12, T23, T34, CT1, CT2, CT3, CT4, R1, R2, R3, R4, R5, R6, R7, f1, f2, f3, f4, SD and TD are the same as those stated in the first embodiment with corresponding values for the seventh embodiment. Moreover, these parameters have the following values and satisfy the following relationships:

| f (mm) | 4.24 | (R3 + R4)/(R3 − R4) | 1.27 |
| Fno | 2.30 | (R5 + R6)/(R5 − R6) | 1.09 |
| HFOV (deg.) | 38.0 | R7/f | 0.46 |
| V1 − V2 | 33.0 | f/f1 | 0.63 |
| V1 − V2 − V4 | 7.4 | f/f3 | 1.79 |
| (T23 + T34)/T12 | 0.27 | (|f3| + |f4|)/(|f1| + |f2|) | 0.42 |
| (CT1 + CT2 + CT4)/CT3 | 0.63 | SD/TD | 0.99 |
| (R1 + R2)/(R1 − R2) | −0.87 | | |

The detailed optical data of the seventh embodiment are shown in Table 13 and the aspheric surface data are shown in Table 14 below.

TABLE 13

7th Embodiment
f = 4.24 mm, Fno = 2.30, HFOV = 38.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.040 | | | | |
| 2 | Lens 1 | 3.715000 (ASP) | 0.615 | Plastic | 1.514 | 56.8 | 6.78 |
| 3 | | −52.418400 (ASP) | 0.808 | | | | |
| 4 | Lens 2 | 33.896600 (ASP) | 0.336 | Plastic | 1.634 | 23.8 | −7.22 |
| 5 | | 4.017600 (ASP) | 0.151 | | | | |
| 6 | Lens 3 | −28.400700 (ASP) | 2.600 | Plastic | 1.535 | 56.3 | 2.37 |
| 7 | | −1.249200 (ASP) | 0.070 | | | | |
| 8 | Lens 4 | 1.957970 (ASP) | 0.690 | Plastic | 1.614 | 25.6 | −3.46 |
| 9 | | 0.882240 (ASP) | 1.300 | | | | |
| 10 | IR-filter | Plano | 0.700 | Glass | 1.517 | 64.2 | — |
| 11 | | Plano | 0.281 | | | | |
| 12 | Image | Plano | — | | | | |

Note:
Reference wavelength (d-line) 587.6 nm

TABLE 14

Aspheric Coefficients

| | Surface # | | | |
|---|---|---|---|---|
| | 2 | 3 | 4 | 5 |
| k = | −2.33888E+00 | −4.30000E+01 | 4.30000E+01 | −1.14217E+01 |
| A4 = | −4.60108E−03 | −2.31755E−02 | −1.31508E−01 | −6.35070E−02 |
| A6 = | −1.56613E−03 | −2.05733E−02 | 3.72994E−02 | 1.63695E−02 |
| A8 = | −6.11729E−03 | 1.23818E−02 | −3.86777E−02 | −5.15893E−03 |
| A10 = | −9.62870E−04 | −1.10719E−02 | 1.16254E−02 | 5.78069E−04 |
| A12 = | −5.43890E−04 | 3.66760E−04 | −3.48922E−03 | 4.07447E−05 |

| | Surface # | | | |
|---|---|---|---|---|
| | 6 | 7 | 8 | 9 |
| k = | 4.30000E+01 | −2.71895E+00 | −6.06407E+00 | −3.00705E+00 |
| A4 = | 2.87536E−02 | −3.06902E−02 | −1.41152E−02 | −2.04083E−02 |
| A6 = | −4.24550E−02 | 1.65467E−03 | −1.72430E−03 | 1.72110E−03 |
| A8 = | 3.23839E−02 | 1.20222E−05 | 6.30710E−04 | 2.22720E−04 |
| A10 = | −1.51634E−02 | −1.02275E−04 | −2.21722E−05 | −9.80496E−05 |
| A12 = | 4.24837E−03 | 1.77780E−05 | −1.14030E−05 | 1.37185E−05 |
| A14 = | −6.42867E−04 | 1.78212E−07 | 1.46607E−06 | −9.48673E−07 |
| A16 = | 4.05680E−05 | | −5.33576E−08 | |

Figure 15:
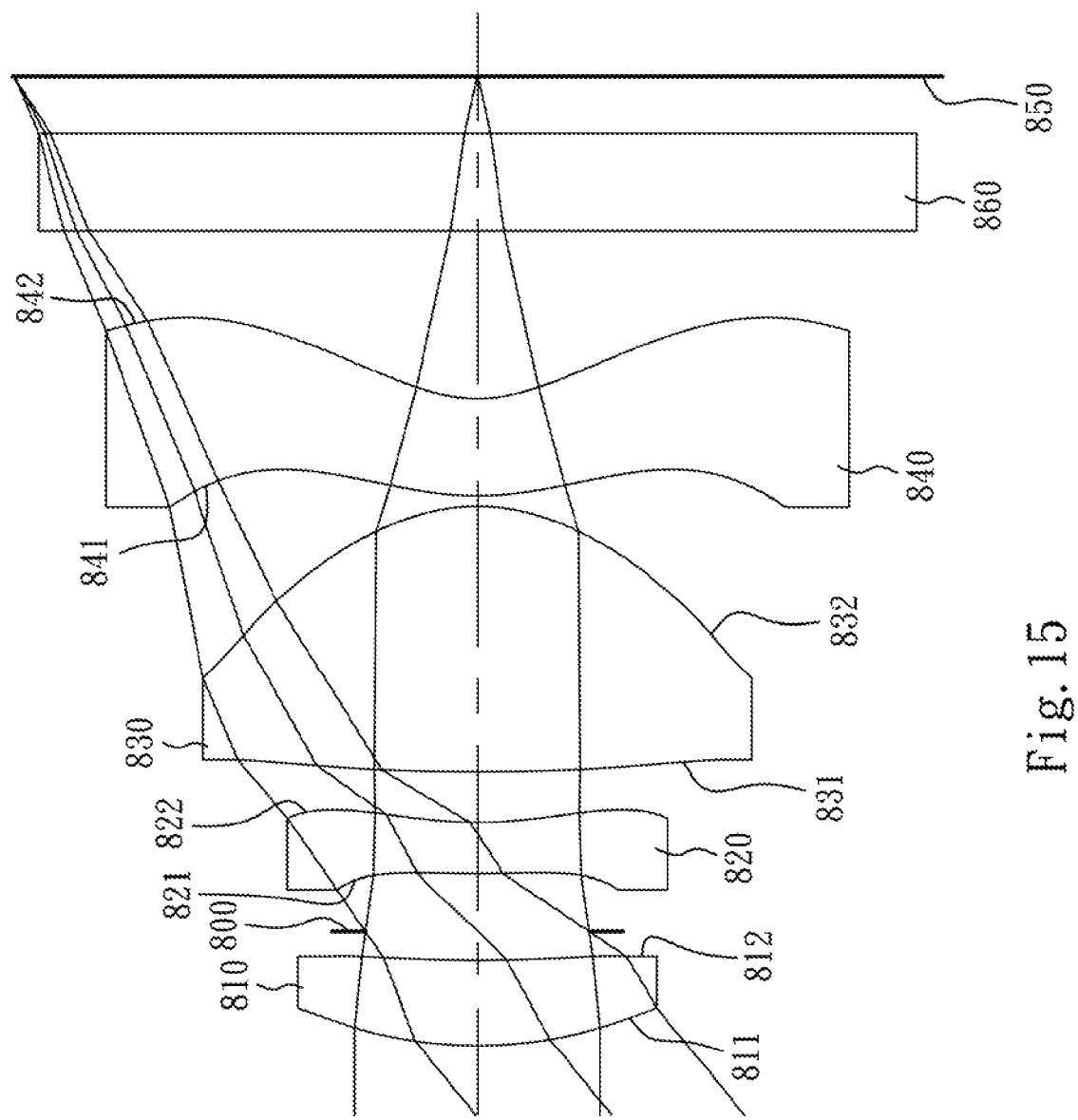
FIG. 15 is a schematic view of an image capturing lens assembly according to the eighth embodiment of the present disclosure.
Figure 16:
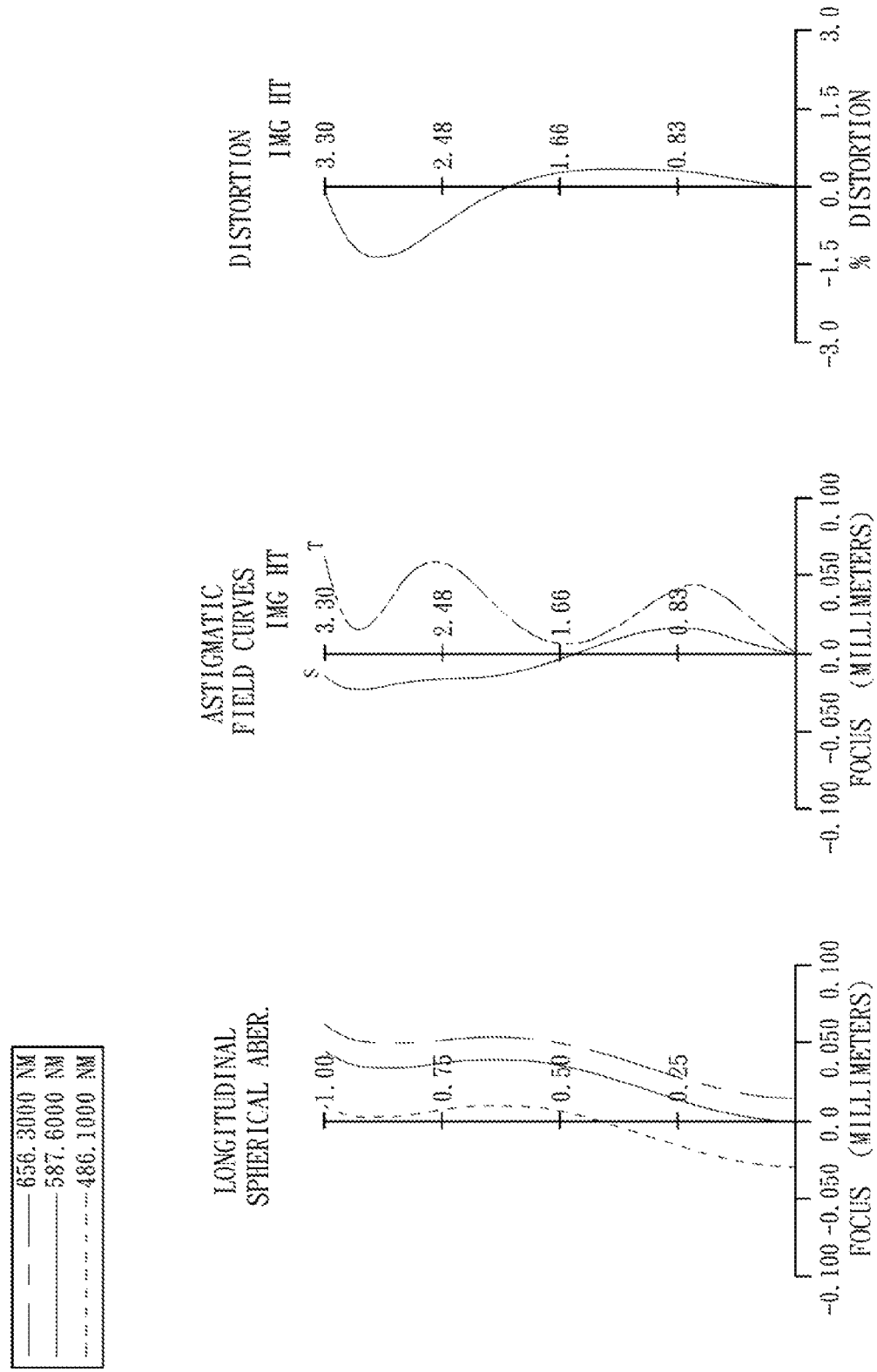
FIG. 16 shows spherical aberration curves, astigmatic field curves and a distortion curve of the image capturing lens assembly according to the eighth embodiment.

FIG. 15 is a schematic view of an image capturing lens assembly according to the eighth embodiment of the present disclosure. FIG. 16 shows spherical aberration curves, astigmatic field curves and a distortion curve of the image capturing lens assembly according to the eighth embodiment. In FIG. 15, the image capturing lens assembly includes, in order from an object side to an image side, the first lens element 810, an aperture stop 800, the second lens element 820, the third lens element 830, the fourth lens element 840, an IR (infrared) cut filter 860 and an image plane 850.

The first lens element 810 is made of plastic material. The first lens element 810 with positive refractive power has a convex object-side surface 811 and a concave image-side surface 812. The object-side surface 811 and the image-side surface 812 of the first lens element 810 are aspheric.

The second lens element 820 is made of plastic material. The second lens element 820 with negative refractive power has a convex object-side surface 821 and a concave image-side surface 822. The object-side surface 821 and the image-side surface 822 of the second lens element 820 are aspheric. Furthermore, the second lens element 820 has inflection points formed on the image-side surface 822 thereof.

The third lens element 830 is made of plastic material. The third lens element 830 with positive refractive power has a convex object-side surface 831 and a convex image-side surface 832. The object-side surface 831 and the image-side surface 832 of the third lens element 830 are aspheric.

The fourth lens element 840 is made of plastic material. The fourth lens element 840 with negative refractive power has a convex object-side surface 841 and a concave image-side surface 842. The object-side surface 841 and the image-side surface 842 of the fourth lens element 840 are aspheric. Furthermore, the fourth lens element 840 has inflection points formed on the object-side surface 841 and the image-side surface 842 thereof.

The IR cut filter 860 is made of glass and located between the fourth lens element 840 and the image plane 850, and will not affect the focal length of the image capturing lens assembly.

The equation of the aspheric surface profiles of the above lens elements of the eighth embodiment is the same as that of the first embodiment, and will not be stated herein again.

In the image capturing lens assembly according to the eighth embodiment, the definitions of f, Fno, HFOV, V1, V2, V4, T12, T23, T34, CT1, CT2, CT3, CT4, R1, R2, R3, R4, R5, R6, R7, f1, f2, f3, f4, SD and TD are the same as those stated in the first embodiment with corresponding values for the eighth embodiment. Moreover, these parameters have the following values and satisfy the following relationships:

| | | | |
|---|---|---|---|
| f (mm) | 4.03 | (R3 + R4)/(R3 − R4) | 2.00 |
| Fno | 2.30 | (R5 + R6)/(R5 − R6) | 0.91 |
| HFOV (deg.) | 39.3 | R7/f | 0.54 |
| V1 − V2 | 0.0 | f/f1 | 0.49 |
| V1 − V2 − V4 | −21.4 | f/f3 | 1.65 |
| (T23 + T34)/T12 | 0.70 | (|f3| + |f4|)/(|f1| + |f2|) | 0.40 |
| (CT1 + CT2 + CT4)/CT3 | 0.88 | SD/TD | 0.82 |
| (R1 + R2)/(R1 − R2) | −1.84 | | |

The detailed optical data of the eighth embodiment are shown in Table 15 and the aspheric surface data are shown in Table 16 below.

TABLE 15

8th Embodiment
f = 4.03 mm, Fno = 2.30, HFOV = 39.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 3.178200 (ASP) | 0.607 | Plastic | 1.530 | 55.8 | 8.27 |
| 2 | | 10.782200 (ASP) | 0.205 | | | | |
| 3 | Ape. Stop | Plano | 0.415 | | | | |
| 4 | Lens 2 | 8.333300 (ASP) | 0.365 | Plastic | 1.530 | 55.8 | −8.09 |
| 5 | | 2.786860 (ASP) | 0.366 | | | | |
| 6 | Lens 3 | 30.386100 (ASP) | 1.900 | Plastic | 1.544 | 55.9 | 2.44 |
| 7 | | −1.358130 (ASP) | 0.070 | | | | |
| 8 | Lens 4 | 2.167160 (ASP) | 0.693 | Plastic | 1.650 | 21.4 | −4.05 |
| 9 | | 1.038620 (ASP) | 1.200 | | | | |
| 10 | IR-filter | Plano | 0.700 | Glass | 1.517 | 64.2 | — |
| 11 | | Plano | 0.409 | | | | |
| 12 | Image | Plano | — | | | | |

Note:
Reference wavelength (d-line) 587.6 nm

TABLE 16

Aspheric Coefficients

| | Surface # | | | |
|---|---|---|---|---|
| | 1 | 2 | 4 | 5 |
| k = | 1.72089E+00 | −1.00000E+00 | −7.56655E+01 | −6.73479E+00 |
| A4 = | 2.81495E−03 | −4.90901E−03 | −1.46859E−01 | −7.33624E−02 |
| A6 = | −1.15658E−02 | −1.13992E−02 | 3.65701E−02 | 1.42340E−02 |
| A8 = | 1.04845E−02 | 3.22609E−03 | −4.17302E−02 | −4.27448E−03 |
| A10 = | −4.48285E−03 | −5.10952E−03 | −1.54929E−03 | −9.74686E−04 |

TABLE 16-continued

| Aspheric Coefficients | | | | |
|---|---|---|---|---|
| A12 = | −5.43888E−04 | 3.66762E−04 | −3.48922E−03 | 4.24326E−05 |

| | Surface # | | | |
|---|---|---|---|---|
| | 6 | 7 | 8 | 9 |
| k = | 8.30000E+01 | −2.66682E+00 | −8.63869E+00 | −3.66518E+00 |
| A4 = | 3.81790E−02 | −3.11598E−02 | −2.61193E−02 | −2.67245E−02 |
| A6 = | −4.32297E−02 | 1.71945E−03 | −2.07487E−03 | 2.00145E−03 |
| A8 = | 3.13481E−02 | −4.32650E−05 | 4.42023E−04 | 1.09789E−04 |
| A10 = | −1.49520E−02 | −1.01871E−04 | −4.54169E−06 | −7.66139E−05 |
| A12 = | 4.25207E−03 | 2.56405E−05 | −7.85633E−06 | 1.24032E−05 |
| A14 = | −6.47099E−04 | 4.07821E−06 | 1.66307E−06 | −9.82139E−07 |
| A16 = | 4.05680E−05 | | −7.41423E−08 | 3.67763E−08 |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An image capturing lens assembly comprising, in order from an object side to an image side:
   a first lens element with positive refractive power and having a convex object-side surface;
   a second lens element with refractive power;
   a third lens element with positive refractive power and having a convex image-side surface; and
   a fourth lens element with refractive power and having a convex object-side surface and a concave image-side surface, wherein the object-side surface and the image-side surface of the fourth lens element are aspheric, and the fourth lens element has at least one inflection point formed on at least one of the object-side surface and the image-side surface thereof;
   wherein a central thickness of the first lens element is CT1, a central thickness of the second lens element is CT2, a central thickness of the third lens element is CT3, a central thickness of the fourth lens element is CT4, an axial distance between the first lens element and the second lens element is T12, an axial distance between the second lens element and the third lens element is T23, an axial distance between the third lens element and the fourth lens element is T34, a curvature radius of the object-side surface of the second lens element is R3, and a curvature radius of the image-side surface of the second lens element is R4, the following relationships are satisfied:

$0.2 < (CT1+CT2+CT4)/CT3 < 0.93$;

$0 < (T23+T34)/T12 < 1$; and $0 < (R3+R4)/(R3-R4) < 5$.

2. The image capturing lens assembly of claim 1, wherein a focal length of the image capturing lens assembly is f, and a focal length of the third lens element is f3, the following relationship is satisfied:

$1.2 < f/f3 < 2.8$.

3. The image capturing lens assembly of claim 2, wherein the second lens element has negative refractive power and has a concave image-side surface, and the fourth lens element has negative refractive power.

4. The image capturing lens assembly of claim 3, wherein the second lens element has at least one reflection point formed on at least one of the object-side surface and the image-side surface thereof, the central thickness of the first lens element is CT1, the central thickness of the second lens element is CT2, the central thickness of the third lens element is CT3, and the central thickness of the fourth lens element is CT4, the following relationship is satisfied:

$0.3 < (CT1+CT2+CT4)/CT3 < 0.7$.

5. The image capturing lens assembly of claim 3, wherein the axial distance between the first lens element and the second lens element is T12, the axial distance between the second lens element and the third lens element is T23, and the axial distance between the third lens element and the fourth lens element is T34, the following relationship is satisfied:

$0 < (T23+T34)/T12 < 0.32$.

6. The image capturing lens assembly of claim 2, wherein the fourth lens element has negative refractive power, the focal length of the image capturing lens assembly is f, and a focal length of the first lens element is f1, the following relationship is satisfied:

$0 < f/f1 < 0.85$.

7. The image capturing lens assembly of claim 6, wherein the second lens element has negative refractive power, a curvature radius of the object-side surface of the third lens element is R5, and a curvature radius of the image-side surface of the third lens element is R6, the following relationship is satisfied:

$0.8 < (R5+R6)/(R5-R6) < 1.5$.

8. The image capturing lens assembly of claim 7, wherein a curvature radius of the object-side surface of the fourth lens element is R7, and the focal length of the image capturing lens assembly is f, the following relationship is satisfied:

$0 < R7/f < 0.65$.

9. The image capturing lens assembly of claim 7, wherein the second lens element has at least one reflection point formed on at least one of the object-side surface and the image-side surface thereof, the focal length of the image capturing lens assembly is f, and the focal length of the third lens element is f3, the following relationship is satisfied:

$1.6 < f/f3 < 2.0$.

10. The image capturing lens assembly of claim 6, wherein the third lens element has a concave object-side surface, and the image capturing lens assembly further comprises a stop, wherein an axial distance between the stop and the image-side surface of the fourth lens element is SD, and an axial distance between the object-side surface of the first lens element and the image-side surface of the fourth lens element is TD, the following relationship is satisfied:

$0.75<SD/TD<0.93$.

11. The image capturing lens assembly of claim 10, wherein the Abbe number of the first lens element is V1, and the Abbe number of the second lens element is V2, the following relationship is satisfied:

$30.5<V1-V2<45$.

12. The image capturing lens assembly of claim 10, wherein a curvature radius of the object-side surface of the first lens element is R1, and a curvature radius of the image-side surface of the first lens element is R2, the following relationship is satisfied:

$-3.0<(R1+R2)/(R1-R2)<-0.7$.

13. The image capturing lens assembly of claim 12, wherein the focal length of the first lens element is f1, a focal length of the second lens element is f2, the focal length of the third lens element is f3, and a focal length of the fourth lens element is f4, the following relationship is satisfied:

$0.3<(|f3|+|f4|)/(|f1|+|f2|)<0.5$.

14. The image capturing lens assembly of claim 6, wherein the Abbe number of the first lens element is V1, the Abbe number of the second lens element is V2, and the Abbe number of the fourth lens element is V4, the following relationship is satisfied:

$-10<V1-V2-V4<25$.

15. The image capturing lens assembly of claim 14, wherein the axial distance between the first lens element and the second lens element is T12, the axial distance between the second lens element and the third lens element is T23, and the axial distance between the third lens element and the fourth lens element is T34, the following relationship is satisfied:

$0<(T23+T34)/T12<0.32$.

16. The image capturing lens assembly of claim 14, wherein a curvature radius of the object-side surface of the third lens element is R5, and a curvature radius of the image-side surface of the third lens element is R6, the following relationship is satisfied:

$0.8<(R5+R6)/(R5-R6)<1.5$.

17. The image capturing lens assembly of claim 14, wherein the central thickness of the first lens element is CT1, the central thickness of the second lens element is CT2, the central thickness of the third lens element is CT3, and the central thickness of the fourth lens element is CT4, the following relationship is satisfied:

$0.3<(CT1+CT2+CT4)/CT3<0.7$.

18. An image capturing lens assembly comprising, in order from an object side to an image side:
a first lens element with positive refractive power and having a convex object-side surface;
a second lens element with refractive power;
a third lens element with positive refractive power and having a convex image-side surface; and
a fourth lens element with refractive power and having a convex object-side surface and a concave image-side surface, wherein the object-side surface and the image-side surface of the fourth lens element are aspheric, and the fourth lens element has at least one inflection point formed on at least one of the object-side surface and the image-side surface thereof;
wherein a central thickness of the first lens element is CT1, a central thickness of the second lens element is CT2, a central thickness of the third lens element is CT3, a central thickness of the fourth lens element is CT4, an axial distance between the first lens element and the second lens element is T12, an axial distance between the second lens element and the third lens element is T23, an axial distance between the third lens element and the fourth lens element is T34, a curvature radius of the object-side surface of the fourth lens element is R7, and a focal length of the image capturing lens assembly is f, the following relationships are satisfied:

$0.2<(CT1+CT2+CT4)/CT3<0.93$;

$0<(T23+T34)/T12<1$; and $0<R7/f<0.80$.

19. The image capturing lens assembly of claim 18, wherein the curvature radius of the object-side surface of the fourth lens element is R7, and the focal length of the image capturing lens assembly is f, the following relationship is satisfied:

$0<R7/f<0.65$.

20. The image capturing lens assembly of claim 18, wherein the central thickness of the first lens element is CT1, the central thickness of the second lens element is CT2, the central thickness of the third lens element is CT3, and the central thickness of the fourth lens element is CT4, the following relationship is satisfied:

$0.3<(CT1+CT2+CT4)/CT3<0.7$.

* * * * *

UNITED STATES PATENT AND TRADEMARK OFFICE
CERTIFICATE OF CORRECTION

PATENT NO. : 8,503,112 B2  
APPLICATION NO. : 13/225491  
DATED : August 6, 2013  
INVENTOR(S) : Po-Lun Hsu and Hsin-Hsuan Huang Page 1 of 1

It is certified that error appears in the above-identified patent and that said Letters Patent is hereby corrected as shown below:

In the Claims

Col. 28, Claim 4, line 2, "reflection" should read "inflection"

Col. 28, Claim 9, line 2, "reflection" should read "inflection"

Signed and Sealed this  
Twenty-sixth Day of November, 2013

Margaret A. Focarino  
*Commissioner for Patents of the United States Patent and Trademark Office*

UNITED STATES PATENT AND TRADEMARK OFFICE
CERTIFICATE OF CORRECTION

Page 1 of 1

PATENT NO. : 8,503,112 B2
APPLICATION NO. : 13/225491
DATED : August 6, 2013
INVENTOR(S) : Po-Lun Hsu and Hsin-Hsuan Huang It is certified that error appears in the above-identified patent and that said Letters Patent is hereby corrected as shown below:

In the Claims

Col. 28, Claim 4, line 19, "reflection" should read "inflection"

Col. 28, Claim 9, line 57, "reflection" should read "inflection"

This certificate supersedes the Certificate of Correction issued November 26, 2013.

Signed and Sealed this
Fourth Day of February, 2014

Michelle K. Lee
*Deputy Director of the United States Patent and Trademark Office*